United States Patent [19]
Andrea

[11] 4,062,723
[45] Dec. 13, 1977

[54] CORE ACCESS SYSTEM FOR NUCLEAR REACTOR

[75] Inventor: Christo Andrea, Windsor Locks, Conn.

[73] Assignee: Combustion Engineering, Inc., Windsor, Conn.

[21] Appl. No.: 617,343

[22] Filed: Sept. 29, 1975

[51] Int. Cl.² .................... G21C 19/20; G21C 19/00; B66C 17/08
[52] U.S. Cl. ...................................... 176/30; 176/27; 214/18 N
[58] Field of Search ................................ 176/30-32, 176/35, 19 R, 36 R, 36 C, 86 R, 87, 23, 25, 26, 27, 40; 214/18 N, 18 R, 28; 294/93, 97

[56] References Cited

U.S. PATENT DOCUMENTS

| | | | |
|---|---|---|---|
| 2,898,281 | 8/1959 | Untermyer | 176/36 R |
| 2,949,202 | 8/1960 | Treshow | 176/30 |
| 3,070,531 | 12/1962 | Huet | 176/30 |
| 3,168,444 | 2/1965 | Ingram | 176/32 |
| 3,183,163 | 5/1965 | Gumuchian | 176/30 |
| 3,354,040 | 11/1967 | Frame | 176/40 |
| 3,619,364 | 11/1971 | Margen | 176/31 |
| 3,773,616 | 11/1973 | Aubert | 176/30 |
| 3,809,607 | 5/1974 | Murray | 176/19 R |
| 3,897,878 | 8/1975 | Peberdy | 176/30 |
| 3,940,311 | 2/1976 | Frisch | 176/36 R |

*Primary Examiner*—Stephen C. Bentley
*Assistant Examiner*—Donald P. Walsh
*Attorney, Agent, or Firm*—Edward L. Kochy, Jr.

[57] ABSTRACT

Improved nuclear reactor arrangement to facilitate both through the head instrumentation and insertion and removal of assemblies from the nuclear core. The arrangement is of the type including a reactor vessel head comprising a large rotatable cover having a plurality of circular openings therethrough, a plurality of upwardly extending nozzles mounted on the upper surface of a large cover, and a plurality of upwardly extending skirts mounted on a large cover about the periphery or boundary of the circular openings; a plurality of small plugs for each of the openings in the large cover, the plugs also having nozzles mounted on the upper surface thereof, and drive mechanisms mounted on top of some of the nozzles and having means extending therethrough into the reactor vessel, the drive mechanisms and nozzles extending above the elevation of the upwardly extending skirts. The improvement in the above type of arrangement comprises a skirt extension and refueling plug for each of the holes of the large rotatable cover for providing access to the nuclear core over each of the assemblies therein. The extension skirt is mountable in sealing relationship to the upwardly extending skirts when the small plugs are removed from the holes in the large rotatable cover, the upwardly extending extension skirt extending upwardly above the elevation of the nozzles on a large rotatable cover when the drive mechanisms have been removed therefrom. The extension skirt includes a laterally extending lip which overlies and is positioned above some of the nozzles in close proximity with the upwardly extending skirt and which supports bearing means for rotatably supporting the refueling plugs for rotation within a circular opening defined within the upwardly extending skirt. The refueling plug includes an opening therethrough through which the assemblies from in the nuclear core may pass. The opening in the refueling plug is such as to provide access over each of the assemblies of the nuclear core upon rotation of the refueling plug and a large rotatable cover.

7 Claims, 27 Drawing Figures

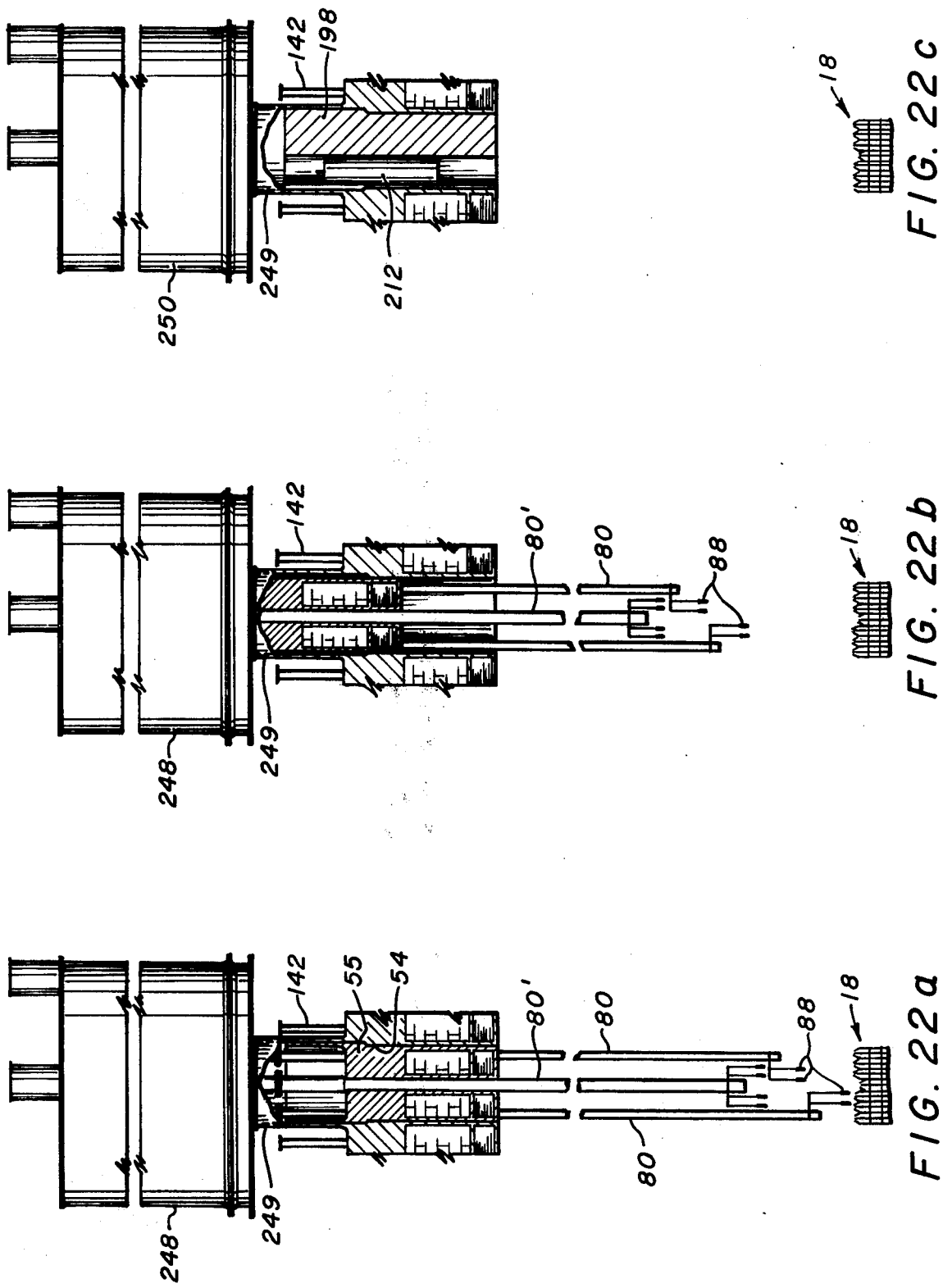

ns therein. The extraction skirt

CORE ACCESS SYSTEM FOR NUCLEAR REACTOR

BACKGROUND OF THE INVENTION

This invention relates generally to nuclear reactor systems and more particularly, to a liquid metal cooled nuclear reactor arrangement which facilitates both through the head instrumentation and refueling of assemblies from in the nuclear core.

In any nuclear reactor which is intended to operate over an extended period of time, such as a reactor which is to be utilized in the generation of electrical power, a reactor facility should be constructed for removal and disposal of used or "spent" fuel element and for recharging or refueling of the reactor with new or unused fuel element. This of necessity involves providing access to the core of the nuclear reactor, this access usually being provided by an opening in the reactor vessel heads.

With liquid metal cooled fast breeder reactors, it is desirable that only a small opening in the vessel head be exposed at any one time to reduce the size of temporary shield and shielding required to prevent the release of fission gases, contact of a liquid metal coolant, such as sodium, with air, and exposure of personnel to radiation.

In the past this has been accomplished with the use of rotating plugs or shields which serve to close off and seal the reactor vessel during normal reactor operation. The rotating plug systems of the prior art, of which U.S. Pat. No. 3,054,741 of J. Tatlock et al is one such example, generally included a first large plug which is approximately the size of the reactor vessel, and which may or may not also be substantially larger than the size of the nuclear core, and a second, smaller plug eccentrically supported thereon and having a lateral dimension approximately equal to ½ or greater than the lateral dimension of the core. The second plug has an eccentric opening and supports additional rotating plug so that access to every region of the core can be obtained by proper rotation of the plugs.

In the design of fast spectrum reactors, provisions must also be made for control mechanisms and usually also for instrumentation for monitoring coolant conditions around and in each fuel assembly. Practically, for safety considerations and for ease in manufacturing, the control mechanism and instrumentation leads must pass through the vessel head. Also, as can be appreciated, it is desirable that the control mechanism be situated in a symmetrical arrangement about the center of the core so as to be better able to control the reactor during normal operation and/or to be able to rapidly shut down the nuclear chain reaction therein in the event of an emergency.

In the prior art systems having relatively large rotating plug systems, it has been difficult to achieve the desirable arrangement of having control mechanism mounted on and passing through the reactor vessel head while having the control mechanisms situated in regular symmetrical pattern. This has been due to the fact that large eccentric tracks for large rotating plugs tend to, of necessity, yield nonsymmetrical arrangements of control mechanisms. Such schemes are further complicated by the desirability of providing instrumentation of the majority of fuel assemblies from in the nuclear core.

In U.S. application Ser. No. 537,216 entitled "Core Access System for Nuclear Reactors" by Dupen filed Dec. 30, 1974, a nuclear reactor arrangement was disclosed which provided through the head refueling and also a regular symmetrical pattern of control and instrumentation mechanisms. In that arrangement, there is provided a large rotating cover having a lateral dimension at least as large as the core and a plurality of small rotating covers eccentrically disposed in openings in the large cover. The invention of that application closely revolved about the size of the circular openings for the small rotating covers. The nuclear core of the reactor arrangement was comprised of a plurality of hexagonally shaped assemblies and the lateral dimension of the openings thus related to the lateral dimension of groups of these assemblies. These groups of assemblies were designated potential control clusters each of which was defined as a regular pattern of one central assembly plus a multiple of six surrounding assemblies. The potential control clusters were defined in a central portion of the core so as to provide an interfitting arrangement thereof so that every assembly in that portion of the core formed a part of one and only one potential control cluster. Then the radial dimension of each of the circular openings in which the small rotating plugs were disposed was defined to be greater than the lateral distance between the central assemblies of two adjacent and contiguous potential control clusters but less than twice that distance. Also each of the smaller rotating covers contained access openings therethrough and were provided with removable closure plugs for closing off the openings. In this way, by properly locating and selecting the number of second smaller rotating covers, every assembly of the core can be reached through the access openings upon proper rotation of the first and second rotatable covers. Also a uniform symmetrical control pattern could be maintained with the control and instrumentation mechanisms located on the reactor vessel head and positioned over the central assembly of a potential control cluster. By doing this, the means for supporting the second rotatable covers could be located between respective control mechanisms of two adjacent potential control clusters.

It is to an improved nuclear reactor arrangement which facilitates both through the head refueling and full instrumentation of the assemblies from in the nuclear core that the present invention is directed.

SUMMARY OF THE INVENTION

An improved nuclear reactor arrangement is provided to facilitate both through the head instrumentation and refueling of assemblies from in the nuclear core. The arrangement is of the type including a reactor vessel head comprising a large rotatable cover having a plurality of circular openings therethrough, a plurality of upwardly extending nozzles mounted on the upper surface of a large cover, and a plurality of upwardly extending skirts mounted on a large cover about the periphery or boundary of the circular openings; a plurality of small plugs for each of the openings in the large cover, the plugs also having nozzles mounted on the upper surface thereof, and drive mechanisms mounted on top of some of the nozzles and having means extending therethrough into the reactor vessel, the drive mechanisms and nozzles extending above the elevation of the upwardly extending skirts. The improvement in the above type of arrangement comprises a skirt extension and refueling plug for each of the holes of the large rotatable cover for providing access to the nuclear core over each of the assemblies therein. The extension skirt is mountable in sealing relationship to the upwardly extending skirts when the small plugs are removed from the holes in the large rotatable cover, the extension skirt extends upwardly above the elevation of the nozzles on a large rotatable cover when the drive mechanisms have been removed therefrom. The extension skirt includes a laterally extending lip which overlies and is above some of the nozzles in close proximity with the upwardly extending skirt and which supports bearing means for rotatably supporting the refueling plugs for rotation within a circular opening defined within the upwardly extending skirt. The refueling plug includes an opening therethrough through which the assemblies from in the nuclear core may pass. The opening in the refueling plug is such as to provide access over each of the assemblies of the nuclear core upon proper rotation of the refueling plug and the large rotatable cover.

Such a nuclear reactor arrangement has particular application for a nuclear reactor system having a plurality of relatively small sized assemblies forming the nuclear core wherein it might be difficult to place rotational supporting bearings between adjacent nozzles as is done in the nuclear reactor arrangement of the type described in U.S. application Ser. No. 537,216. During reactor operation, control and instrumentation of the nuclear core takes place through the reactor vessel head, i.e. the large rotatable cover and a plurality of small stationary plugs supported within the holes of the large cover. In order to refuel or remove assemblies from within the core, a small plug within the large rotatable cover is removed and replaced with an extension skirt and refueling plug. The extension skirt provides a way of placing the rotational supporting bearings above the elevation of the nozzles extending upwardly on the reactor vessel head. After refueling has taken place, the refueling plug and extension skirt are removed and replaced with the instrumentation and control mechanism supporting plugs.

BRIEF DESCRIPTION OF THE DRAWINGS

FIG. 22a depicts a schematic representation of a handling cask for removing an instrument plug positioned on the reactor vessel head to receive such plug;

FIG. 22b depicts a schematic representation of the handling cask of FIG. 22a receiving the instrument tree plug;

FIG. 22c depicts a schematic representation of the handling cask and of the handling plug which has been inserted into the penetration in the reactor vessel head from which the instrument tree plug has been removed;

DESCRIPTION OF THE PREFERRED EMBODIMENT

Figure 1:
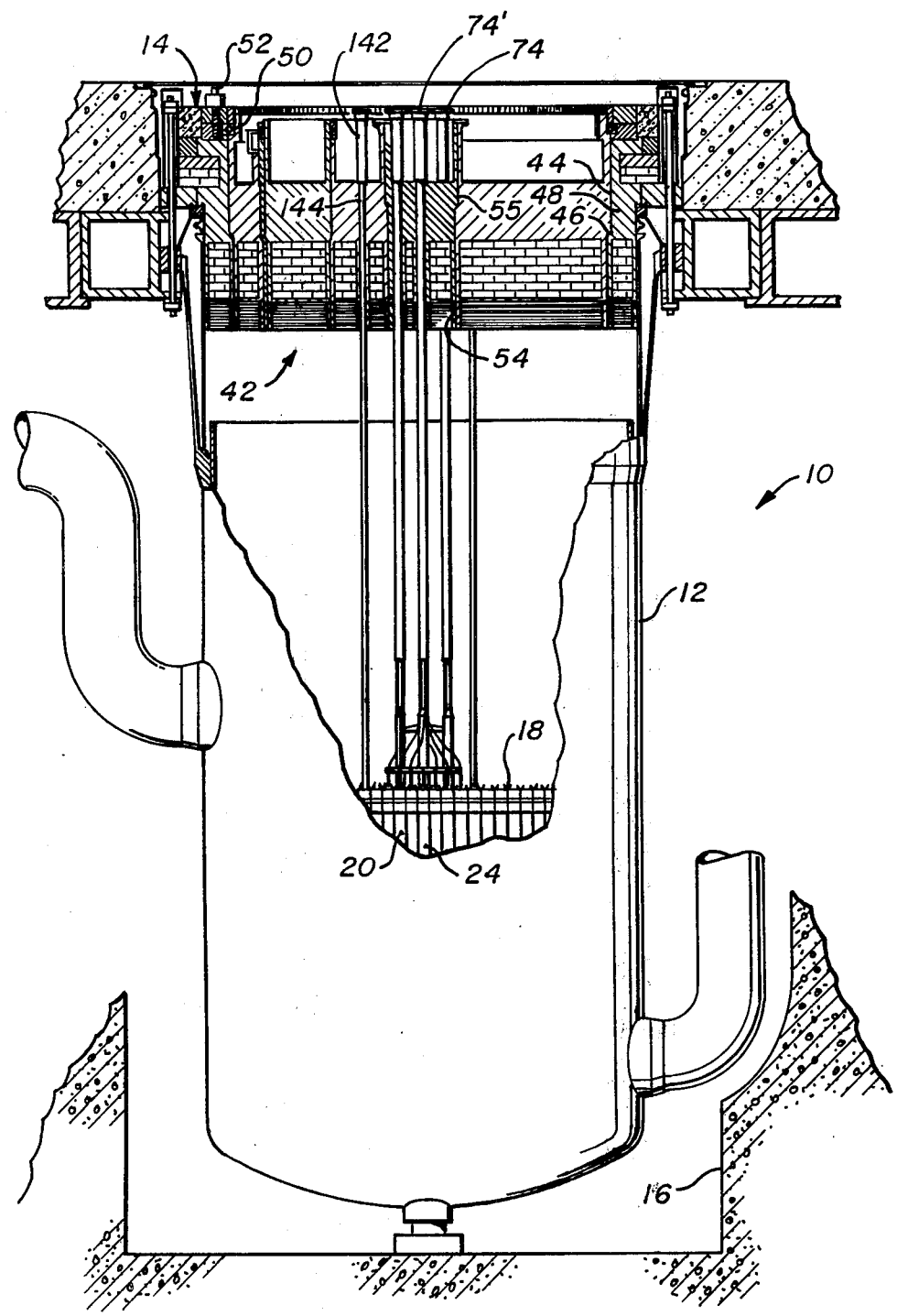
FIG. 1 is a partial sectional elevation of a nuclear reactor which incorporates the present invention.

Referring to FIG. 1 there is shown generally a liquid metal cooled, fast spectrum reactor 10 comprising a reactor vessel 12 and a reactor vessel head 14 vertically disposed and supported within a concrete containment structure 16. The reactor vessel 12 houses a nuclear core 18 comprised of a plurality of fuel assemblies 20 arranged and supported in a fixed array by support structure (not shown), as is well known in the art. The fuel assemblies 20 are comprised of fuel pins within a shroud or housing that contains nuclear material for sustaining a nuclear chain reaction. The housings 22 of fuel assemblies 20, as is conventional, are each of a hexagonal cross-section. Interspersed within an array of hexagonally shaped fuel assemblies 20 and arranged in a regular pattern are a plurality of hexagonally shaped control assemblies 24. The control assemblies 24 are comprised of an elongated, hexagonally shaped housing 26 which forms an aperture at its upper end in the array, and control elements (not shown), such as rods of a neutron absorbing material, adapted for longitudinal movement therewithin. Drive means 28 and 30, supported on the reactor vessel head 14 and extending downward therethrough (to be described in greater detail below) are coupled to the control elements for effecting longitudinal movement thereof to control and regulate the nuclear chain reaction in the core 18. By way of the nuclear chain reaction, substantial amounts of heat are generated within the core 18 and conveyed to a primary coolant, such as for example liquid sodium, which is introduced into and removed from the reactor core 18 by coolant inlet and outlet conduits 32 and 34 respectively. The heated coolant may then be cooled by a heat exchange system (not shown) to generate steam which is passed to a turbine which drives an electric generator for the ultimate transformation of thermal energy into electrical energy.

Generally, the reactor vessel head 14 serves to seal the reactor vessel 12 and provide biological shielding, thermal insulation and alignment between the nuclear core 18 and interfacing system such as control, instrumentation, and core access systems. It is a general requirement that all penetration and/or leakage paths around and through the reactor vessel head 14 be sealed to prevent ingress of gases into the reactor vessel 12 which might react with the liquid metal coolant and egress therefrom of cover gas possibly contaminated by released fission products and nuclear radiation. The biological shielding and thermal insulation may comprise a series of shielding blocks 36 and reflector insultating plates 38 housed within a welded steel enclosure structure 40.

For practical considerations related to safety and ease of manufacturing and construction of liquid metal cooled fast spectrum reactors 10, control of the reactor operations take place through the top of the reactor vessel 12. Additionally, it is desirable that instrumentation of fuel assemblies 20 for monitoring the behavior of the liquid coolant in a nuclear core 18 also take place through the reactor vessel head 14. Still further, as can be appreciated, symmetrical patterns of vessel head penetrations are desirable. A symmetrical control pattern permits more efficient and finer control of the reactor 10 while a symmetrical instrumentation pattern minimizes the complexity of mechanisms for locating the instruments in the fuel assemblies 20. Complicating achievement of the above noted desirable features is the fact that it is equally desirable to provide a core access system in which only a small portion or area of the core 18 is exposed for refueling at any one time.

While some systems have been developed which accommodate a symmetrical control and instrumentation pattern and which provide for through the head, line of sight refueling (see for example U.S. application Ser. No. 537,283 filed Dec. 30, 1974 for "Control Rod and/or Instrument Tree Assembly" by Noyes et al and U.S. application Ser. No. 537,284 filed Dec. 30, 1974 for "Core Access System for Nuclear Reactors" by Dupen). Such systems are not always applicable nor can they be utilized in the manner described for all reactor designs. For example, the above mentioned pending U.S. Applications disclose a control and/or instrumentation scheme and core access system respectively for gas spectrum reactors which have cores comprised of relatively large hexagonally shaped assemblies. While such a system is theoretically applicable for smaller subassembly sizes, it is not easily adaptable because of physical restraints in regards to the size of components for use with relatively small size assemblies comprising the nuclear core. For example, with small sized assemblies, say on the order of 4 inches across the flat, the number of penetrations through the reactor vessel head per the instrumentation and control schemes disclosed in the above cited applications is greatly increased for a given area. This then presents problems with regard to the spacing between the control drive mechanisms supporting nozzles on the reactor vessel head which in turn presents problems with regard to the placing of rotational supporting bearings for rotatable access plugs between adjacent nozzles. Accordingly, different systems might be appropriate for a given nuclear reactor depending on the size of assemblies making up the core. It is to an alternative and improved instrumentation and control scheme and core access system that the present application and its companion application, entitled "Plug Mounted Core Servicing Apparatus" and filed on the same date as the present application are directed.

It is to be noted, of course, that while the present invention as well as the inventions described in the other above mentioned co-pending applications have been designed for a particular application with a given size of fuel assembly, that the inventions may have application with regard to other size fuel assemblies.

The core servicing apparatus of the present invention provides a symmetrical quite regular arrangement of core servicing elements with respect to the nuclear core so as to achieve the desirable advantages which result from such an arrangement. By servicing elements or means, it is meant that the means provides a service to the reactor. Customarily, this includes the services of monitoring, inspecting or controlling the nuclear core, although other services may also be performed. To carry out such conventional services, a servicing element may include for example a thermo-couple, an eddy current flow meter probe, a neutron detector, or a neutron absorption element. The symmetrical pattern afforded by the present invention, accordingly results in a regular pattern or arrangement of such elements and thereby provides for complete and adequate services for the core.

As noted hereinabove, with respect to smaller size assemblies comprising the nuclear core, the problem of limiting the number of penetrations in the reactor vessel head becomes more acute. As noted in both the above mentioned co-pending application, Ser. Nos. 537,283 and 537,284 it is desirable that servicing means be placed either in or with respect to every assembly of the nuclear core. With respect to each penetration through the reactor vessel head then it is desirable that the core servicing apparatus be placed in and extending through such penetrations to provide services to a large number of the assemblies and thus a large area of the nuclear core. To accomplish this, and still maintain a reduced penetration size, it is necessary or desirable that means be provided for laterally displacing the servicing means, which extend through the limited size penetration, outward with respect to the boundaries of that penetration.

That is, it is desirable to pass the core servicing apparatus in a compacted position through a relatively small size penetration and then laterally expand or extend the apparatus from the compacted state. In this way a larger area of the core may be serviced through a limited sized penetration. Such an arrangement for providing lateral displacement of servicing means is complicated further when the size of the subassemblies is reduced, as a certain size must be maintained for the penetration in order to provide room for components which can't be reduced in size and which are necessary for other interfacing systems.

Accordingly, the core servicing apparatus of the present invention includes a removable plug from which is supported and suspended the servicing element for the nuclear core. The removable plug in turn is supported within an opening provided in the reactor vessel head. Briefly stated, and to be described in greater detail hereinbelow, the core servicing apparatus comprises a plurality of support columns suspended from the plug, rigid support means laterally extending and supported by each of the support columns, and a plurality of servicing means which are in turn supported from the laterally extending rigid support means. Means are then provided for rotating the rigid support means and servicing means from a condensed position which lies totally within the coextensive boundaries of the plug opening, to an expanded position in which some of the rigid support means and servicing means lie outside of the coextensive boundaries of the plug. In this way a core area can be serviced by a removable plug in which the cross-sectional dimension of the plug is less than the cross-sectional area of the core which is serviced by the servicing means suspended from the plug.

With such an arrangement then, in which servicing apparatus is supported from a plurality of removable plugs which are in turn supported by the reactor vessel head, direct line of sight through the head refueling can be accomplished as another aspect of the present invention. Such refueling involves replacing the removable plugs in the reactor vessel head with extension skirts and refueling plugs mounted on top of the reactor vessel head within the penetration vacated by the core servicing plug. Briefly stated, and to be described in greater detail hereinbelow, the skirt extension has laterally extending portions on which are supported rotational supporting bearings for the refueling plug. The reactor vessel head includes a large rotatable cover which overlies the entire core and which includes penetrations therethrough for the core servicing and refueling plugs. With such an arrangement in which the core servicing plugs are replaced with refueling plugs which are rotatable, the entire core can be serviced for refueling with a limited number of penetrations for the refueling plugs by proper rotation of the refueling plugs and of the vessel head large rotating cover. Such rotation can position the access penetration in the reflecting plugs over each and every fuel assembly forming the core of the reactor.

PLUG MOUNTED CORE SERVICING APPARATUS

More specifically now, referring to FIG. 1 the reactor vessel head 14 includes a relatively large rotatable plug or cover 42 which is supported in an opening 44 in the reactor vessel head. This large rotatable cover 42 is virtually identical to that disclosed in co-pending application Ser. No. 537,284 with respect to its composition. Of course, the size or lateral dimension of the plug and the penetrations therethrough for the plug mounted core servicing apparatus are different. During reactor operation the large rotatable cover is stationarily supported on appropriae flanges 46 provided in the annular support ring 48 which defines the boundary of the large reactor vessel opening. As more fully described in co-pending application Ser. No. 537,284, the plug 42 is mounted for rotational movement by means of appropriate bearings 50 spaced about the periphery of the large cover and supported on the annular support ring 48. The capability for rotational movement is achieved by actuating hydraulic screw jackets 52 to raise the large cover off the support flanges and to place the load on the bearings. The large rotatable cover 42 includes a plurality of penetrations 54 therethrough, in which are supported the core servicing plugs 55. In the embodiments shown and described herein, eight of such penetrations are provided.

Figure 5:
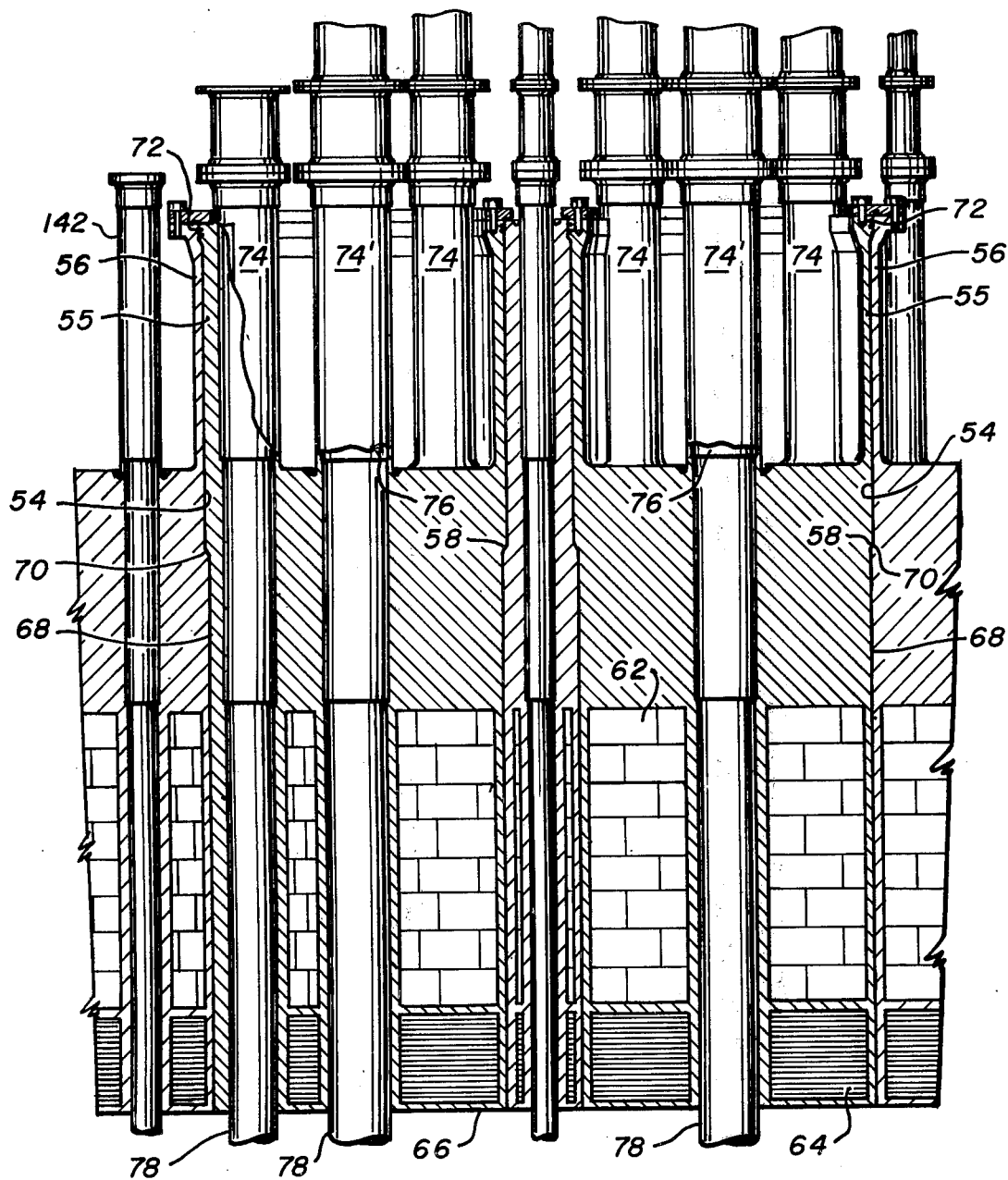
FIG. 5 is a sectional elevation of the reactor vessel head taken along line 5—5 of FIG. 2.

As best shown in FIG. 5, the boundaries of these openings or penetrations through the large rotatable cover are defined by upwardly extending skirts 56 welded to the upper surface of the reactor vessel head about the penetrations. As with the large annular support ring for the large rotatable cover, the penetrations through the large cover include inwardly extending flanges 58 which serve to support the removable plugs of the core servicing apparatus during normal reactor operation. Also included along the upper surface of the large rotatable cover are a plurality of upwardly extending nozzles 60 welded to and spaced about the ligament between the penetrations 54 of the large rotatable cover. These nozzles are hollow and extend through the entire thickness of the large rotatable cover 42 and serve as a housing to support single core servicing apparatus to complete the core servicing or instrumentation and control of the nuclear core as will be described in more detail hereinbelow. As can be seen from FIGS. 1 and 5, the upwardly extending nozzles on the large rotatable cover are located between adjacent upwardly extending skirts 56 and extend a short distance above the upper elevation of these skirts.

Each of the core servicing plugs 55 are of the same composition as the rest of the reactor vessel head, i.e., they include graphite blocks 62 and reflector insulating plates 64 within a weld steel enclosure 66. The lower end 68 of the plug 55 is of a reduced diameter to provide a flange 70 to rest on the flange 58 within the penetration in the large rotatable cover. Appropriate sealing means such as O-ring type seals 72 are provided along the cylindrical surface of the plugs 55 so as to effectively mate and seal the plugs when mounted in the penetrations 54 of the large rotatable cover. As noted above, these plugs are stationarily supported and do not rotate, thus no rotational bearings are provided.

In the preferred embodiment, each of the core servicing plugs 55 includes seven upwardly extending nozzles 74, 74', similar to those nozzles provided on the large rotatable cover 42. Within the nozzles there is provided a penetration 76 through the plug within which are supported a downwardly extending support column 78, 78' of the core servicing apparatus 80, 80' as will be described in detail below. There is one central nozzle somewhat larger in diameter than the remaining six nozzles which surround the central nozzle and are located near the periphery of the plugs 55. As with the arrangement disclosed in co-pending application Ser. No. 537,284, the size or lateral dimension of the core servicing apparatus support plug 55 is related to the size of specified interfitting groups of assemblies 82 formed in the nuclear core. Again as in the aforementioned application, these interfitting groups of assemblies 82 are designated potential control clusters and in the preferred embodiment comprise a central hexagonally shaped assembly and six surrounding hexagonally shaped assemblies contiguous with the center assembly (see FIGS. 4 and 6). The nozzles 74, 74' on each of the plugs 55 are located such that the center lines of two adjacent nozzles 74, 74' coincide with the center of two adjacent and interfitting potential control clusters 82. The specific size of each of the nozzles and thus the internal diameter of the nozzles and of the penetrations through the plug can and do vary depending on whether the nozzle is located at the periphery of the plug or located in the center of the plug as best shown in FIG. 5. Peripheral nozzles will hereinafter be designated by the reference number 74 and central nozzles by the number 74'. Also throughout the description, where like reference numerals are used, the number bearing a "prime" (') designation will be associated with a central core servicing assembly. This size difference is a result of the fact that the central and peripherally located core servicing assemblies service different numbers of fuel assemblies in the core. Accordingly, the diameter or lateral dimension of the small plugs 55 is somewhat greater than twice the distance between the centers of two adjacent and interfitting potential control clusters 82. In any event, however, it is less than four times the distance as the boundary of the plug must fall between two adjacent nozzles, one on the plug and one on the large rotatable cover.

As noted above, there are two general types of core servicing assemblies, central instrumentation servicing assemblies 80' and peripheral instrumentation servicing assemblies 80. Each of the peripheral assemblies 80 service 10 of the fuel assemblies 20 found in the core and the central assemblies 80' service 19 of such fuel assemblies.

With either type of servicing assembly 80, 80', there is provided a guide tube and instrument tree support column 84, 84', laterally extending support structure 86, 86', and servicing means 88 such as instrumentation for monitoring the flow and temperature of the liquid metal coolant or means for effecting longitudinal movement of control or neutron absorbing control elements. The servicing means 88, i.e., either the instrumentation or control element drive extensions are supported from the support column and have means extending upwardly within the guide tube and instrument tree support column to exit above the reactor vessel head. Each of the servicing means is rigidly laterally fixed with respect to the support column 84, 84' and in some of the assemblies, namely the peripheral servicing assemblies 80, means are provided for rotating servicing means about the center line or access of the peripheral servicing assembly. As seen generally in FIG. 7, the laterally extending structure 86, 86' is fixed to a central support column 78, 78' which extends upwardly into and through the outer guide tube and instrument tree column 84, 84' which terminates some distance above the nuclear core. In the case of instrumentation, the instrument probes 88, which typically comprise either a thermo-couple or a flow meter, are suspended from the ends of the support structure 86, 86' in a fixed array with respect to the nuclear core 18 and with respect to the support column 84, 84'. Electrical leads 116 housed in a flexible conduit 92 connected to the instrument probes pass upwardly from the support structure 86, 86' and radially inward around the central support shaft 78, 78'. The leads then extend upward around the shaft into the guide tube and instrument tree 84, 84' and exit above the nozzles 74, 74' supported on the plug 55 through an electrical connector assembly 94. In case of control drive extensions, in the preferred embodiment the extensions extend downward within the central support shaft 78, 78' and enter into appropriate apertures in a control assembly which is in alignment with the axis of the servicing assembly. Of course, this means that the large rotatable cover and the servicing plugs must be maintained in a fixed position with respect to the core. This can be easily accomplished by the use of guide pins (not shown).

More specifically now, turning first to a peripheral servicing assembly 80 as shown in greater detail in FIGS. 9-12, the peripheral assembly includes a vertically extending support column comprised of an outer cylindrical tubular member 84 and a concentrically positioned inner cylindrical tubular member 78 supported for longitudinal movement relative to the plug 55 within one of the peripheral nozzles 74 supported on the servicing plugs. Basically, the general arrangement and composition of the components of the support column 84 at the elevation of the reactor vessel head 14 is the same as the arrangement and composition of the components for the control rod and/or instrumentation assemblies of previously cited co-pending application Ser. No. 537,283, which application is hereby incorporated by reference. Accordingly, the detailed description of the arrangement will not be set forth herein. The outer guide tube 84 is supported within the upwardly extending nozzle 74 and extends downward through the thickness of the head to a position above the nuclear core 18. The outer guide tube 84 includes a laterally extending support flange 96 which, in the assembly's lowermost position, rests on the ledge 98 of the nozzle 74. Within the outer guide tube a central tube 100, concentric with the guide tube 84 extends the full length of the outer tube and downwardly below the termination of the outer tubes and is in alignment with and engages an assembly 20 of the nuclear core. For control type assemblies which include control element drive extensions, the inner tube 100 houses and serves as a guide for the control element drive extension 102 which also extends downwardly from above the reactor vessel head 14 where it is connected to a drive mechanism, either a safety drive mechanism 28 or a shim type drive mechanism 30, and extends downwardly into a control assembly 24 where the actuator is then coupled to the control element (not shown). Spaced equally about the inner tubular member are a plurality of instrumentation pull tubes 104 which are supported in guide tubes 106 at the upper end of the assemblies. The guide tubes 106 extend downwardly partially into the reactor vessel head 14 where they are in registry with appropriate bores 108 and shielding cylinders 110 which are provided along the thickness of the reactor vessel head. The shielding cylinders 110 are attached to the central tubular member 100 and thus the guide tube and instrument tree and accordingly move therewith during vertical movement of the assembly. As pointed out above, the shielding cylinders 110 have holes or bores 108 therethrough in alignment or registry with a mating guide tube 106 through which the pull tubes 104 extend downward to the termination of the outer tubular member 84 (see Number 112 FIG. 9). Within each of the pull tubes the electrical leads 92 connected to the instrumentation probes 88 extend upwardly and are packed with an appropriate shielding material such as powdered steel shot. At the upper ends of the guide tube, the pull tubes 104 are maintained in fixed and sealing relationship by means of an appropriate yoke 114 (see FIG. 10). The leads 116 from the pull tube extend upwardly therefrom within the outer guide tube 106 and nozzle 74 and exit from the assembly through an electrical connector assembly 94 mounted to the top of the nozzle 74.

Figure 11:
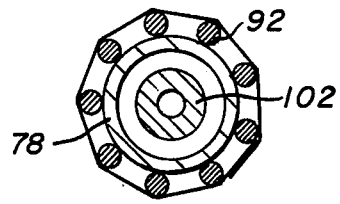
FIG. 11 is a cross-sectional view of the peripheral instrument tree assembly below the reactor vessel head taken along line 11—11 of FIG. 9.
Figure 9:
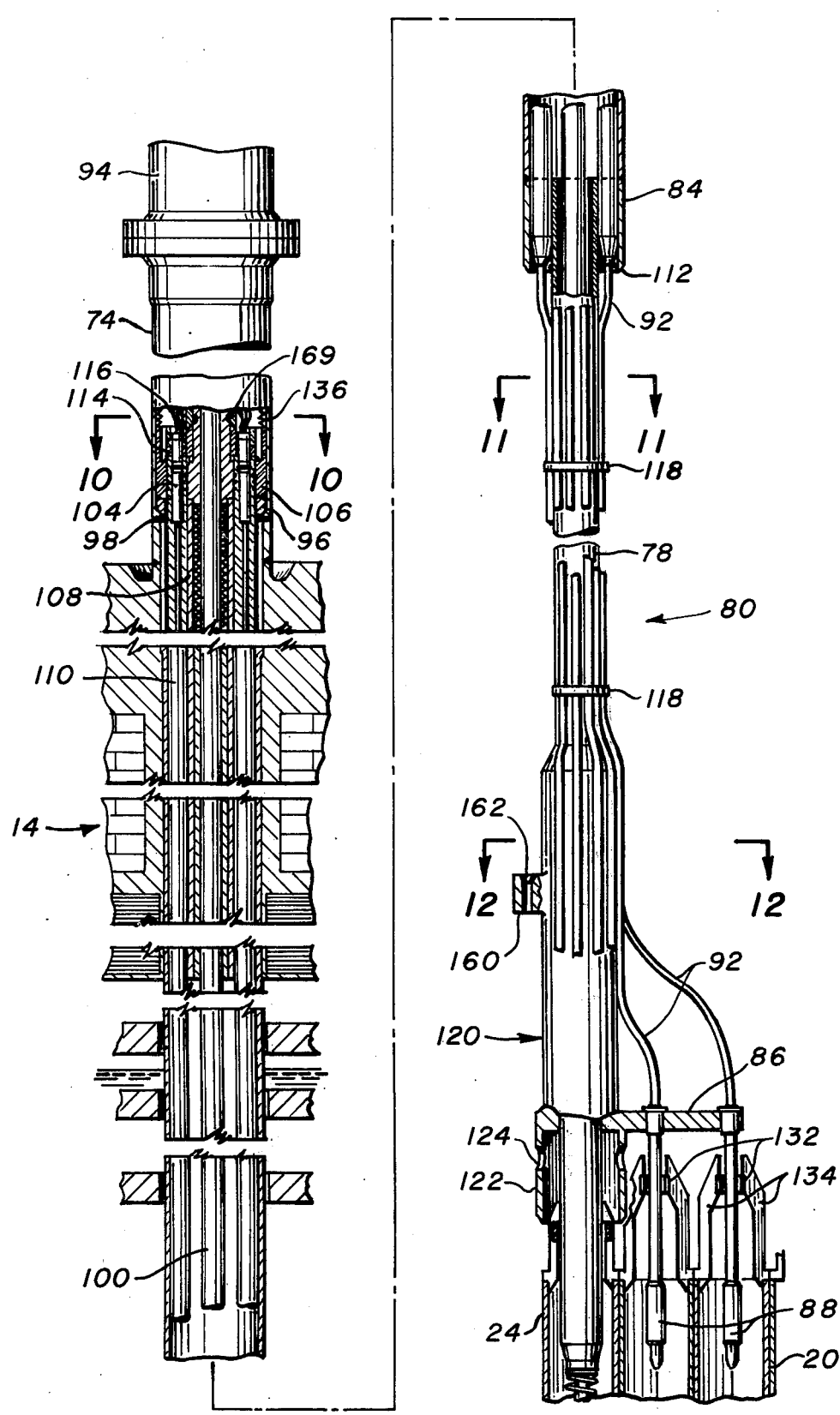
FIG. 9 is an enlarged sectional elevation of a peripheral instrument tree assembly showing the assembly along its full length as mounted in the reactor vessel head and extending downward toward and into engagement with the nuclear core.
Figure 12:
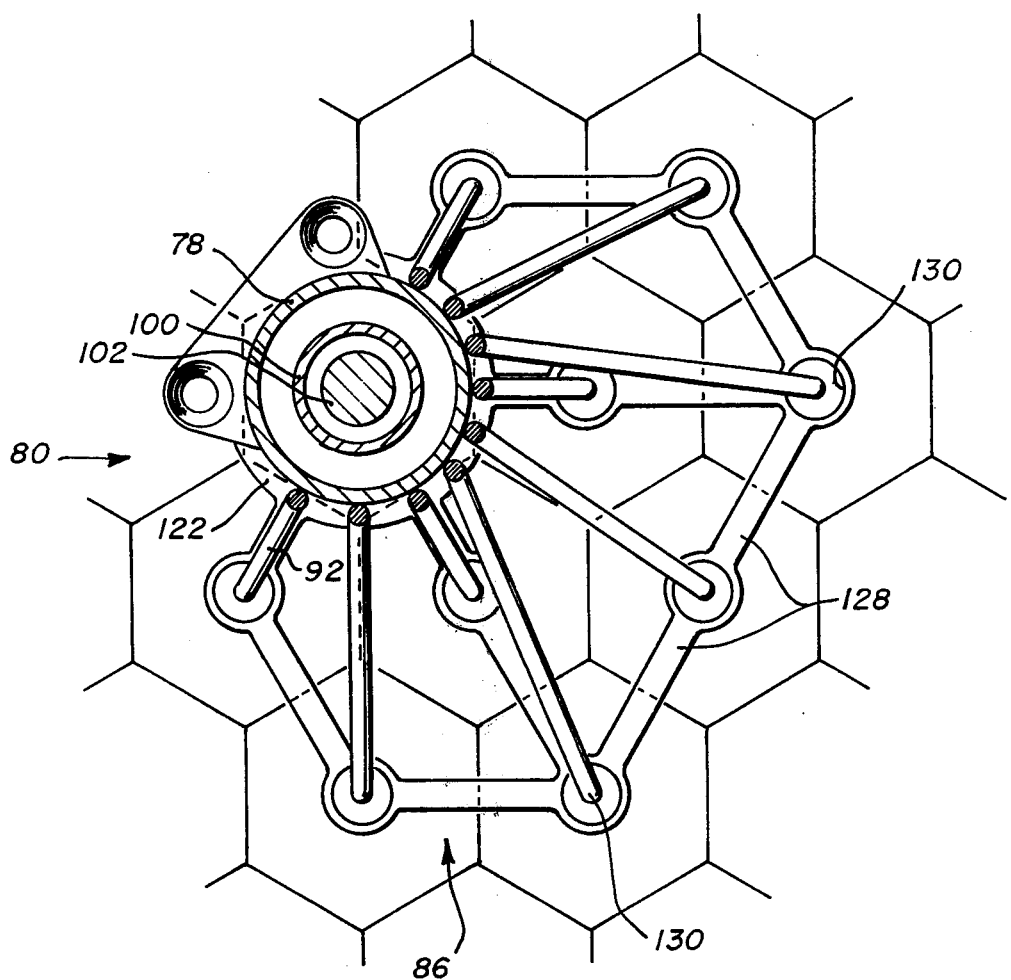
FIG. 12 is an enlarged cross-sectional view of the lower end of the peripheral instrument tree assembly taken along line 12—12 of FIG. 9.

At the lower end of the outer tubular member 84 the electrical leads 116 are housed within a flexible conduit 92 which in turn is attached to the bottoms of the pull tubes 104 and extends downwardly along the outside of the inner tubular member or support column 78. Referring to FIGS. 9, 11 and 12, the conduits 92 are initially spaced equally about the inner tubular member 78 as they exit from the outer tubular member 84 and eventually near the lower end of the inner tubular member 78 are grouped around one-half or side thereof. Appropriate guides and clamps 118 are provided along the outer surface of the inner tubular member 78 to maintain the conduits 92 in a fixed position.

Figure 4:
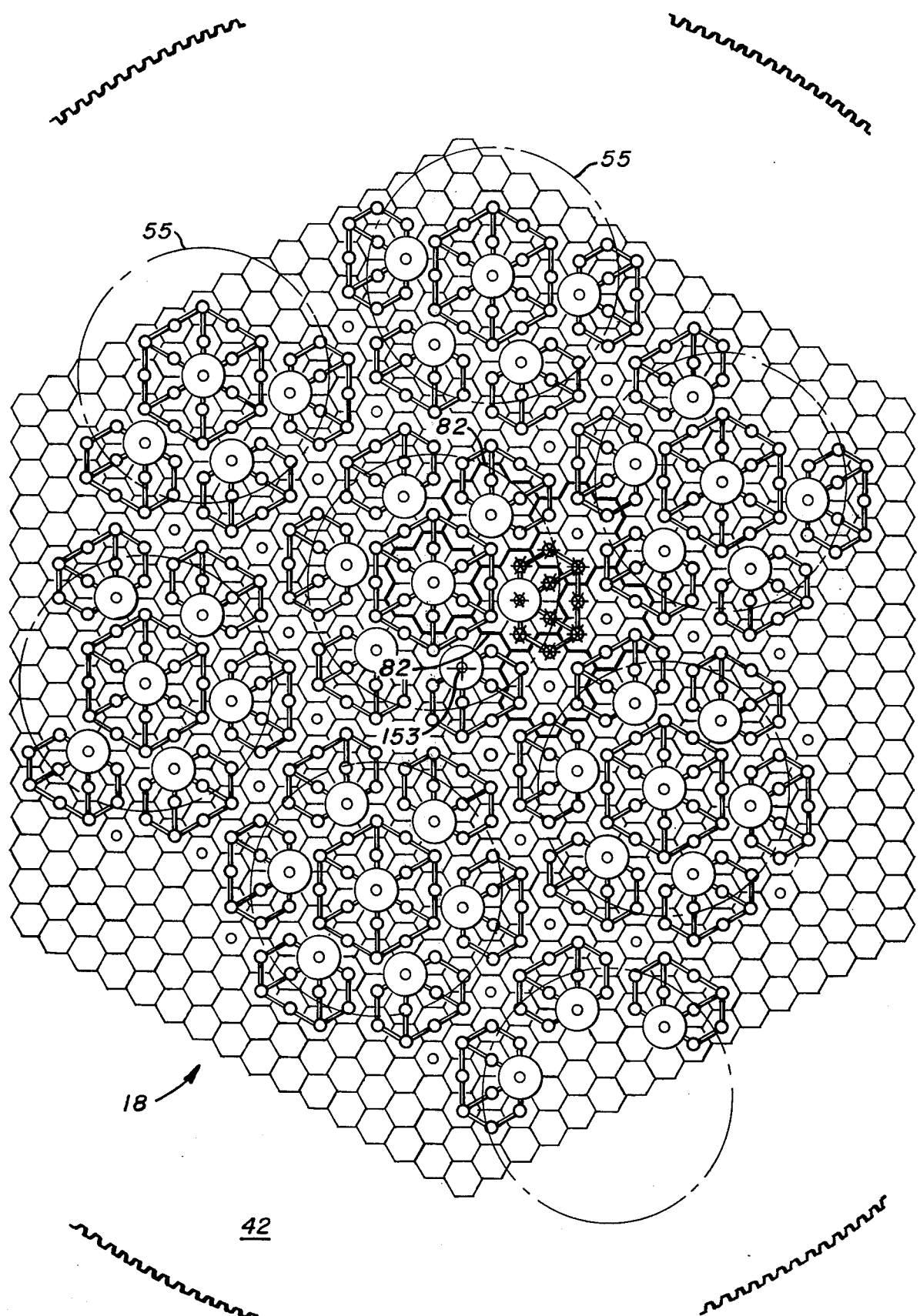
FIG. 4 is an enlarged plan view of the core and instrumentation therein of the nuclear reactor of FIG. 1.

The lower end 120 of the inner tubular member 78, which is of an enlarged size compared to the upper portion for the purpose of housing the control rod latch mechanisms, includes a spreader assembly 122 which is adapted to fit over the top end of the control rod receiving assembly 24. The spreader assembly 122 includes appropriate openings 124 for directing the liquid metal coolant, which flows upwardly around and through the assemblies, outwardly from the interior of the spreader 122. Extending laterally from the upper end of the spreader assembly 122 is the lateral support structure 86 comprised of a plurality of segments 128 located at various distances and at various angles from the enlarged lower section 120 of the inner tubular member. This lateal support structure includes a plurality of sockets 130 therein at the end of each arm 128 through which the flexible conduits 92 containing the instrument probe leads pass and are fixed so as to be supported in a generally vertical direction above the fuel assemblies 20 surrounding the control assemblies 24 which are to be serviced. As best seen in FIG. 9, when the spreader assembly 122 is engaged with a control assembly 24, the lateral support structure 86 is maintained in a fixed position several inches above the upper end of the fuel assemblies 120. this support structure 86 serves to tie the instrument probes 88 together in a fixed array which corresponds to the arrangement of fuel assemblies within the core; that is, the sockets 130 and accordingly the instrument probes are maintained in a fixed pattern such that when properly oriented they will lie directly above the centers of the fuel assemblies 20 surrounds the central assembly 24. As is seen in FIGS. 4 and 12, the fuel assemblies served by the instrument probes from a peripheral servicing assembly 80 comprise five (four if the central assembly is a control assembly) fuel assemblies of a potential control cluster plus five fuel assemblies from three adjacent interfitting potential control clusters. The assemblies serviced by a typical peripheral servicing assembly are identified by a star in FIG. 4 with the central potential control cluster and the three adjacent potential control clusters outlined in lines of heavy thickness. The significance of this pattern will be apparent as the description continues. As can be seen from FIG. 9, the instrument probes 88 are situated within guide rings 132 attached to the upwardly extending fins 134 of the fuel assemblies 20.

The only difference between an instrument servicing assembly and a control servicing assembly lies in the fact that instrument servicing assemblies are provided with an instrumentation lead along the central axis in place of a control element drive extension. In such a configuration, the instrument lead is supported within the central tubular member 78 in an appropriate manner so as to extend vertically down therein and into the upper end of the fuel assembly 20 over which the spreader assembly 122 is situated. As pointed out above, in such a situation the peripheral assembly will serve ten fuel assemblies instead of the nine fuel assemblies plus one control assembly served by a control peripheral assembly.

As has been noted hereinabove, the instrumentation probes or servicing means of a peripheral assembly 80 can be moved between a compacted state and an expanded or normal state. In the preferred embodiment, this displacement is accomplished by combined vertical and rotational movement of the instrumentation probes 88. Vertical movement of the peripheral assembly is accomplished in a manner similar to that utilized for the control rod and instrument assemblies of co-pending incorporated application Ser. No. 537,283. This involves the use of a control rod drive extension rod and an auxiliary drive unit which are temporarily removably secured to the upwardly extending nozzles 74 on the reactor vessel head 14 and which serve to replace control rod drive mechanisms and electrical connector assemblies. A further description of the process for raising the instrumentation and control servicing assemblies will be set forth hereinbelow. During vertical upward movement of the guide tube and instrument tree assembly (hereinafter GTIT) within the upwardly extending nozzles 74, an effective seal is maintained between these elements to prevent the egress of fission gases and contaminated cover gases from the reactor and ingress of oxygen or air into the reactor through the use of bellows type seals. In the preferred embodiment, these bellows type seals 136 are sealingly secured to the upwardly extending nozzles 74 and to the upper end of the GTIT outer tube 84. Depending on the extent of vertical travel which is desired, the bellows type seal may be attached to the outwardly extending flange from the GTIT and to the nozzle at its other end, so as to permit vertical movement while maintaining the seal.

Figure 17:
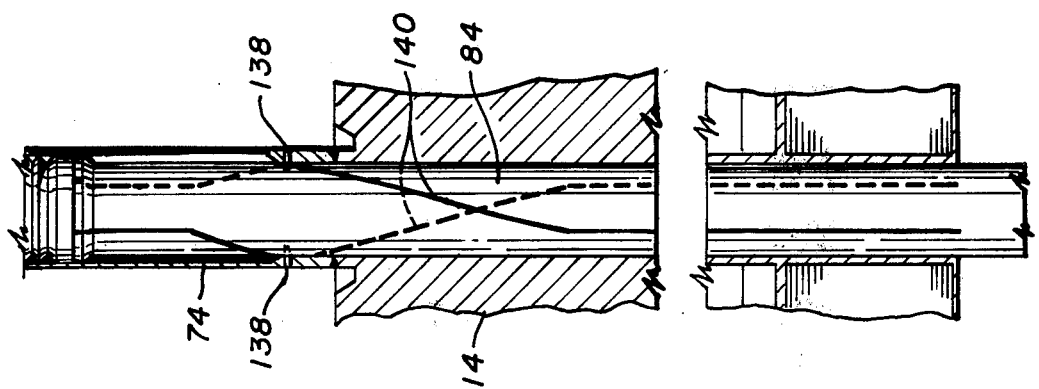
FIG. 17 is an enlarged elevational view of the upper end of a peripheral instrument tree assembly, partly in section, depicting the guide pin and slot arrangement for rotating a peripheral instrument tree assembly.

In the preferred embodiment, rotational movement of the instrument probes of peripheral assemblies is accomplished by means of a pin and slot arrangement at the upper elevation of the reactor vessel head. A plurality of pins 138 are provided along the inside wall of the upwardly extending instrumentation nozzle 74. As best seen in FIG. 17, these pins extend laterally inward and are adapted to engage and fit into appropriate slots 140 machined along the outer surface of the outer cylindrical tube 84 of the GTIT. These slots, which in the preferred embodiment comprise two slots located on diametrically opposite sides, extend along the length of the outer tube 84 and have a helical portion near the upper end thereof. The helical portion extends approximately half way around the tube in a gradual slope so that as the guide tube 84 and instrument tree is lowered within the nozzle 74 the pins 138 engaging the slots 140 serve to rotate the guide tube and instrument tree assembly 80 approximately 180°. The slots 140 are arranged so that the full rotational movement of 180° is achieved for the peripheral assemblies 80 near the lower end of vertical travel of the guide tube and instrument tree assembly. However, this rotational movement is completed with the instrument probes 88 are located a short distance above the nuclear core, so that the rotational movement will not cause interferences between downwardly depending instrument probes and the upwardly extending fins 134 on the assemblies forming the nuclear core. Straight portions of the slot 140 are provided at both the upper and lower ends of the helical portion so that only longitudinal, vertical motion of the GTIT assembly and accordingly the instrument probes occurs when the pins engage these portions of the slots.

Figure 2:
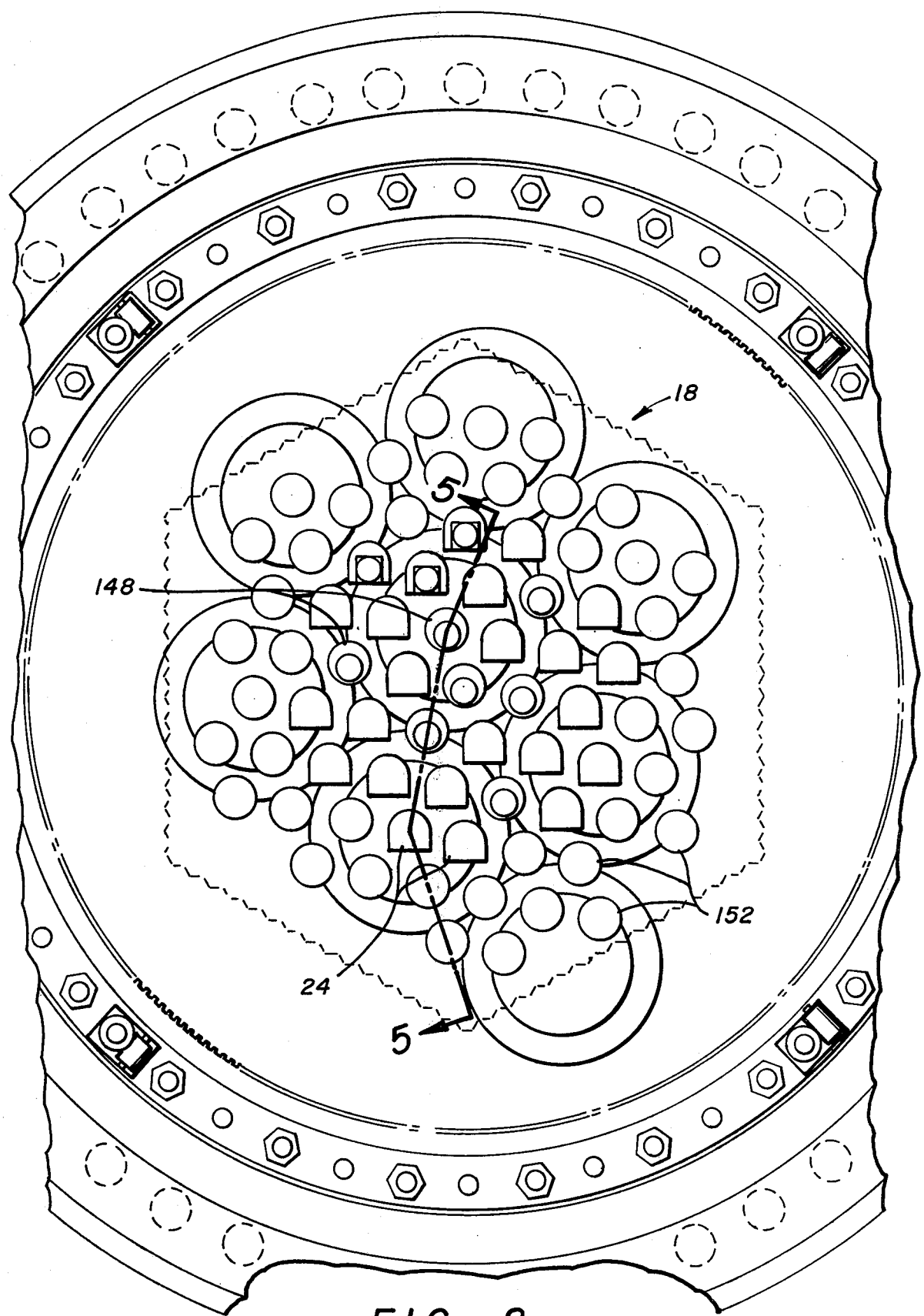
FIG. 2 is a plan view of the nuclear reactor of FIG. 1.
Figure 3:
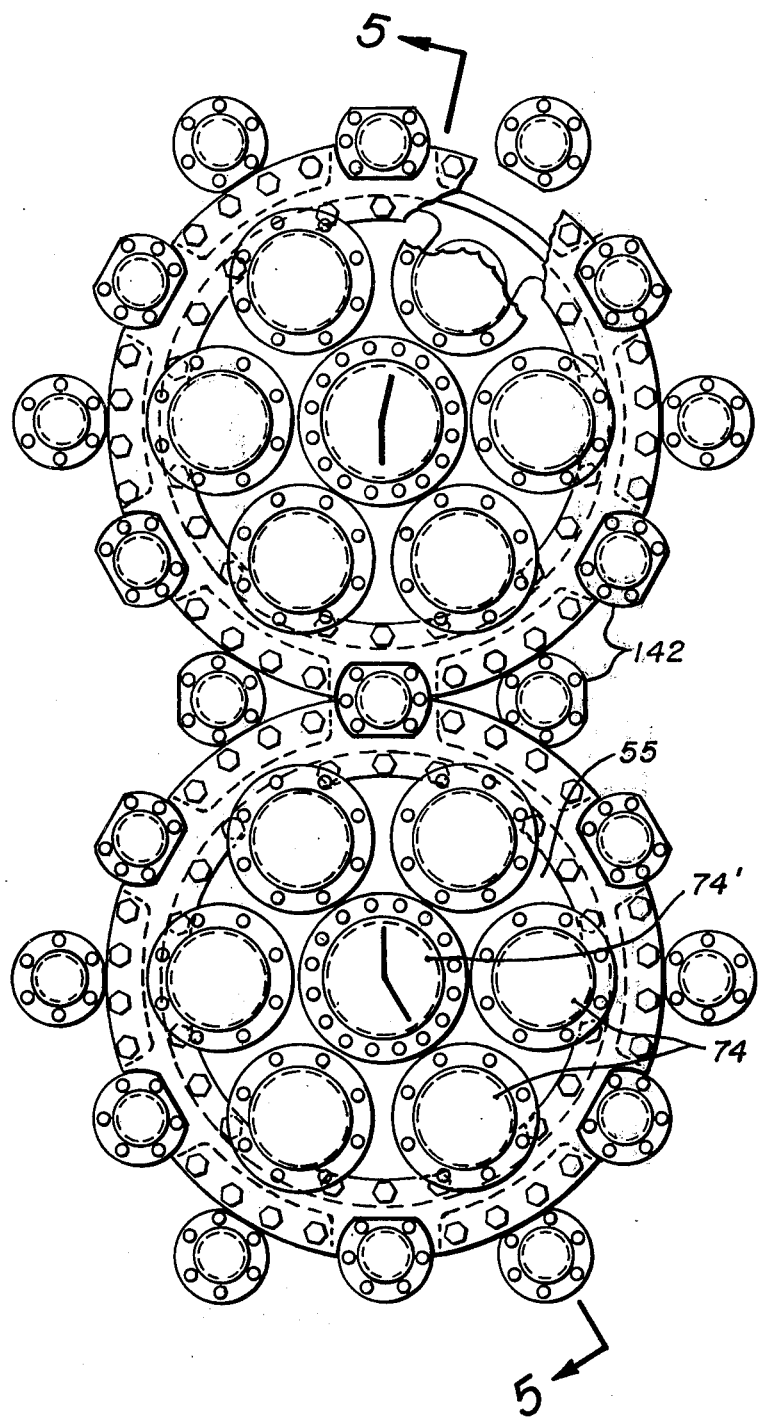
FIG. 3 is a further enlarged plan view similar to FIG. 2 showing two adjacent small rotating plugs in greater detail.
Figure 6:
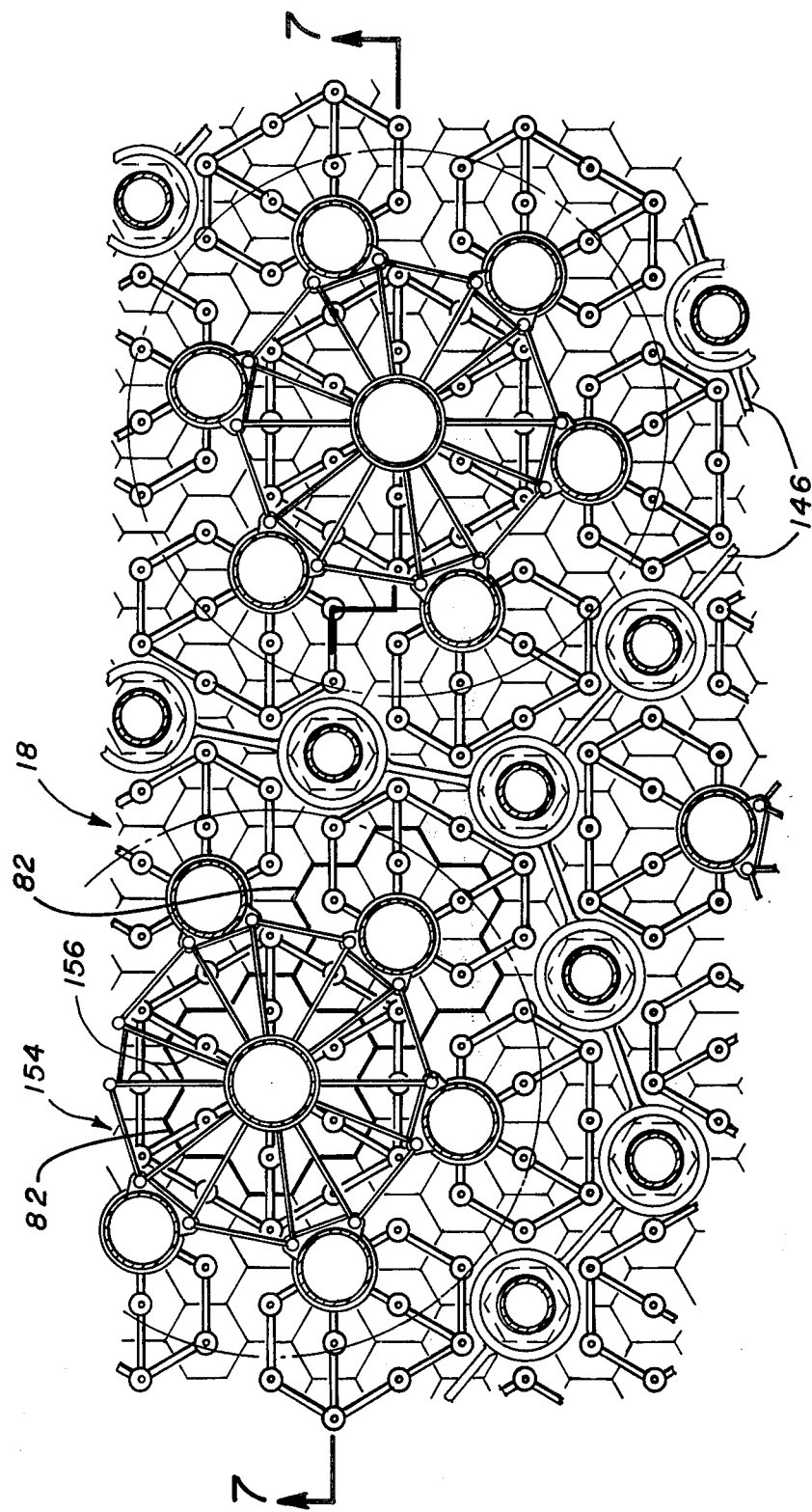
FIG. 6 is an enlarged plan view of a portion of FIG. 4 showing the pattern of instrumentation of the core in more detail.
Figure 7:
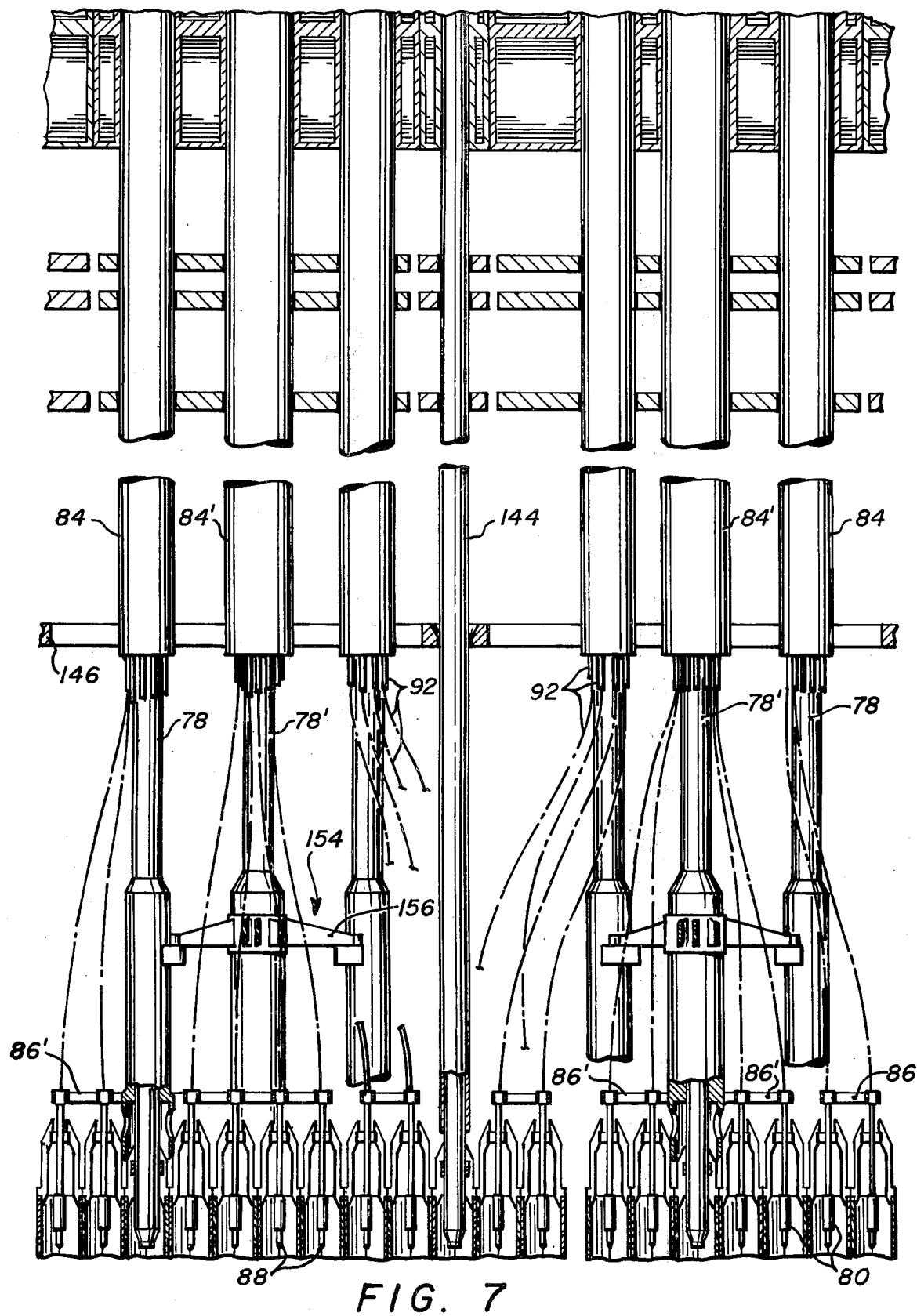
FIG. 7 is a sectional elevation of a portion of the nuclear core and the instrumenation therefor taken along line 7—7 of FIG. 6.
Figures 13, 14, 15:
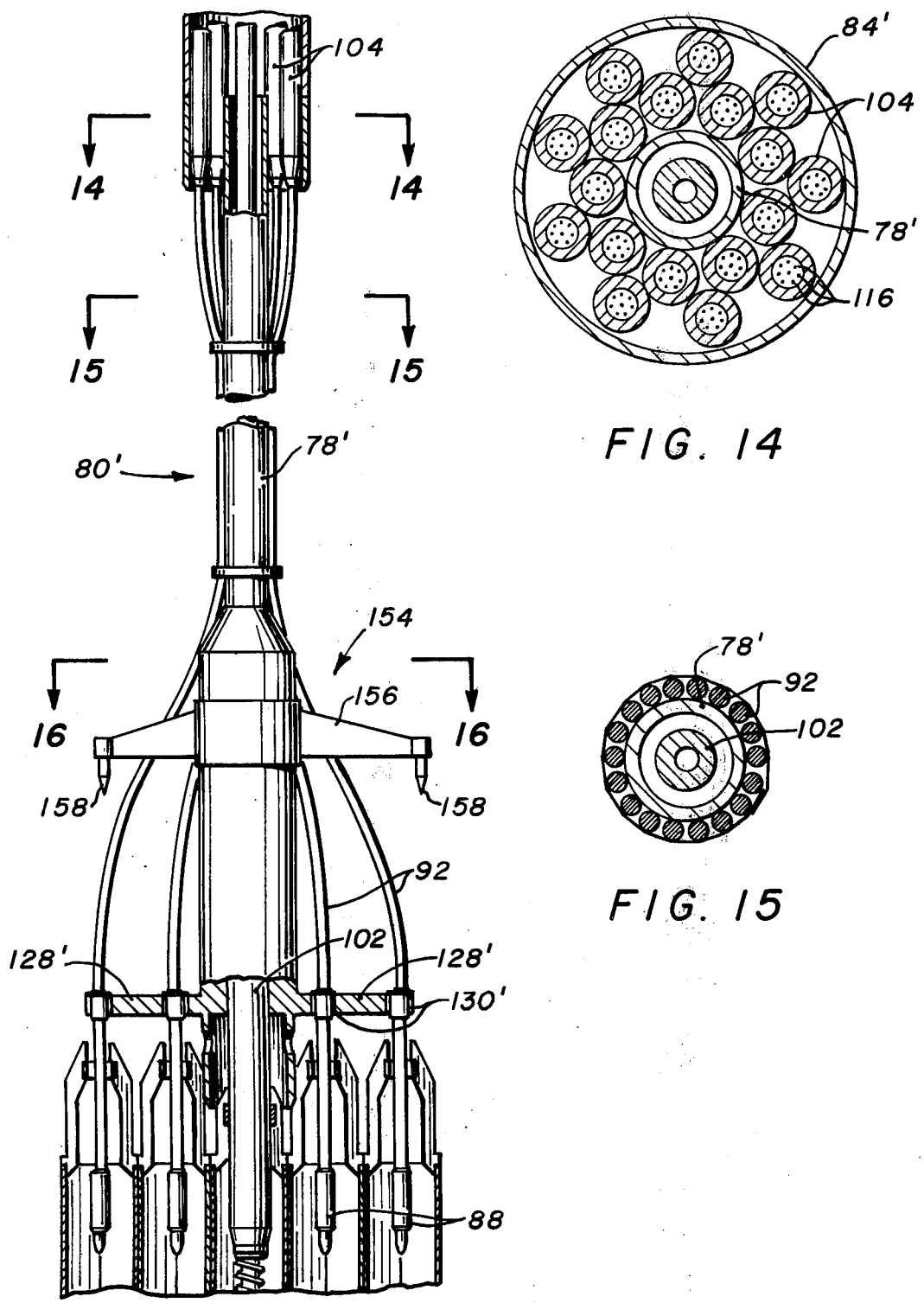
FIG. 13 is an enlarged elevation, partly in section, of the lower end of a central instrument tree assembly in engagement with the nuclear core.
FIG. 14 is a cross-sectional view of a central instrument tree assembly taken along line 14—14 of FIG. 13.
FIG. 15 is a cross-sectional view taken along line 15—15 of FIG. 13.

Referring now to FIGS. 13-16, the general arrangement for a central servicing assembly 80' is similar to that of a peripheral servicing assembly 80 with appropriate changes so as to accommodate a greater number of instrumentation probes and deletion of the provision for rotational movement. As the servicing means of a central assembly always remains within the coextensive boundaries of the instrumentation plug 55, it is not necessary to provide for rotation or other displacement of the servicing means between compacted and extended positions to permit removal of the plug from which it is suspended and to permit servicing of a portion of the nuclear core. In the preferred embodiment, the central servicing assemblies 80' are designed to service 19 assemblies, comprising a 7 assembly potential control cluster 82 and 12 adjacent assemblies of surrounding and interfitting potential control clusters. This arrangement can best be seen in FIG. 16. As with the peripheral assembly, the central assembly 80' overlies and is in axial alignment with the center assembly of a potential control cluster. This central assembly may be either a control assembly 24 or a conventional fuel assembly requiring instrumentation. Depending upon which it is, a control element drive extension 102 or an instrumentation lead is provided within the central inner tubular member 78'. Again, the central inner tubular member 78' extends downward into the core 18 and engages through a spreader 122', the upper end of a central assembly. Also provided at the lower end of the central assembly and attached to the inner tubular member is a support structure 86' comprising an array of support arms 128' extending laterally outward therefrom and having appropriate sockets 130' into which instrumentation conduits 92 are received and supported. A socket overlies the center of each of the 18 assembly positions which surround and are closest to the central assembly. These 18 surrounding assemblies comprise the first two rows radially outward from the central assembly. The flexible conduits 92 within which the instrumentation leads 116 are housed are attached to the upper ends of the instrumentation probes 88 and extend upwardly and inwardly to be positioned about the outside surface of the inner central tubular member 78'. From there the instrumentation leads 116 extend upwardly into pull tubes 104' which are located in the annular space between the outer tubular member 84' and the inner central tubular member 78'. As seen in FIG. 14, the pull tubes 104 are arranged in two rows at different radial distances from the centerline of the assembly. The pull tubes 104 extend upwardly and terminate a short distance above the reactor vessel head where they are housed within and sealed within appropriately provided guide tubes, also arranged in two rows about the centerline of the assembly. Again, an appropriate bellows seal is provided which is attached to the upwardly extending nozzle 74' and also to the outer guide tube 84' of the central instrument tree in order to provide sealing during vertical movement of the assembly. This arrangement is similar to that shown in FIG. 9 for a peripheral assembly and thus is not shown in a separate drawing. With the arrangement described above, the core of a liquid metal cooled fast breeder reactor, or at least a central portion thereof, can be fully instrumented, and a regular pattern of control obtained. As best seen in FIGS. 2, 4 and 6, the nuclear core is comprised of 469 assemblies, each assembly being 4 inches across the flats in the preferred embodiment. Eight core servicing plugs 55 are provided in a specified pattern shown in FIGS. 2 and 4. Each of these plugs is capable of servicing 79 assemblies if the preferred arrangements described hereinabove are utilized. As no open portions are provided in the nuclear core, it is necessary to provide additional instrumentation or control mechanisms at various positions between adjacent plugs. These are indicated in the figures by small individual nozzles 142 and guide tubes 144 respectively, which are supported over an assembly located between adjacent plugs 55. In accordance with the preferred embodiment, the assemblies over which these small nozzles and/or guide tubes are positioned are the central assemblies of potential control clusters and, accordingly, will be provided with either control rod drive mechanisms or instrumentation probes. In either case, the guide tube 144 which is supported within the nozzle 142 on the reactor vessel head extends all the way down into the core and engages the appropriate assembly with which it is aligned. Referring to FIG. 7, a control rod guide grid 146 is provided above the nuclear core having appropriate rings joined together to guide the guide tubes depending from the reactor vessel head for the smaller single servicing means and which provide lateral support therefore. The grids are open beneath the plugs so as not to provide any interference with regard to the assemblies thereof. A particular instrumentation and control pattern is disclosed in FIG. 2. As can be seen from FIG. 2, since each nozzle provided on the reactor vessel head overlies the central assembly of a potential control cluster, there are provided 7 safety control assemblies 148, 24 shim control assemblies 150, and 43 instrumented central assemblies 152. The control rods of a safety control assembly 7 are normally maintained during reactor operation in a raised position relative to the core to provide a safety margin for shutdown in the event of a reactor accident while the shim control rods provide the regulation of power output during normal reactor operation. The specific drive mechanisms and control rod extensions for such arrangements are adequately described in copending application Ser. No. 537,283, and as they are virtually identical in the preferred embodiment of the present invention, a description of these is not necessary. The remaining assemblies within the central portion of the core are provided with instrumentation probes such as described hereinabove. The pattern of these instrumentation probes with respect to the core is shown for the preferred embodiment in FIG. 4.

As can be seen from FIG. 4, the central axis of the reactor vessel head conicides and is aligned with the center of the nuclear core (see reference number 153), and the central core servicing plug 55 (position shown in outline) is offset from the center. This arrangement of plugs having a concentric reactor vessel head and eccentric plug arrangement has been chosen in order to provide the requisite refueling coverage when refueling plugs and extension skirts replace the core servicing plugs 55 and rotation is permitted as will be described hereinbelow. While not all assemblies comprising the nuclear core are instrumented, the majority of the assemblies are. The three outermost rows of assemblies forming the core comprise the shielding and reflector assemblies and as such do not contain any nuclear fuel. The next three innermost rows comprise blanket region assemblies which contain nuclear fuel but which do not generate power. As can be seen from FIG. 4, all the assemblies in Rows 1–10 (counting from the center outward), the power generating portion of the nuclear core, are serviced by the plugs and single penetration servicing elements. Of the blanket assemblies, only 23 of the assemblies are serviced. While the concentric large plug and eccentric array of small plugs arrangement does not provide all the servicing of all the assemblies forming the active core, it does provide servicing for the major portion and presents no problems as a result of non-servicing (in particular not instrumenting) of some of the blanket region assemblies.

Figure 18:
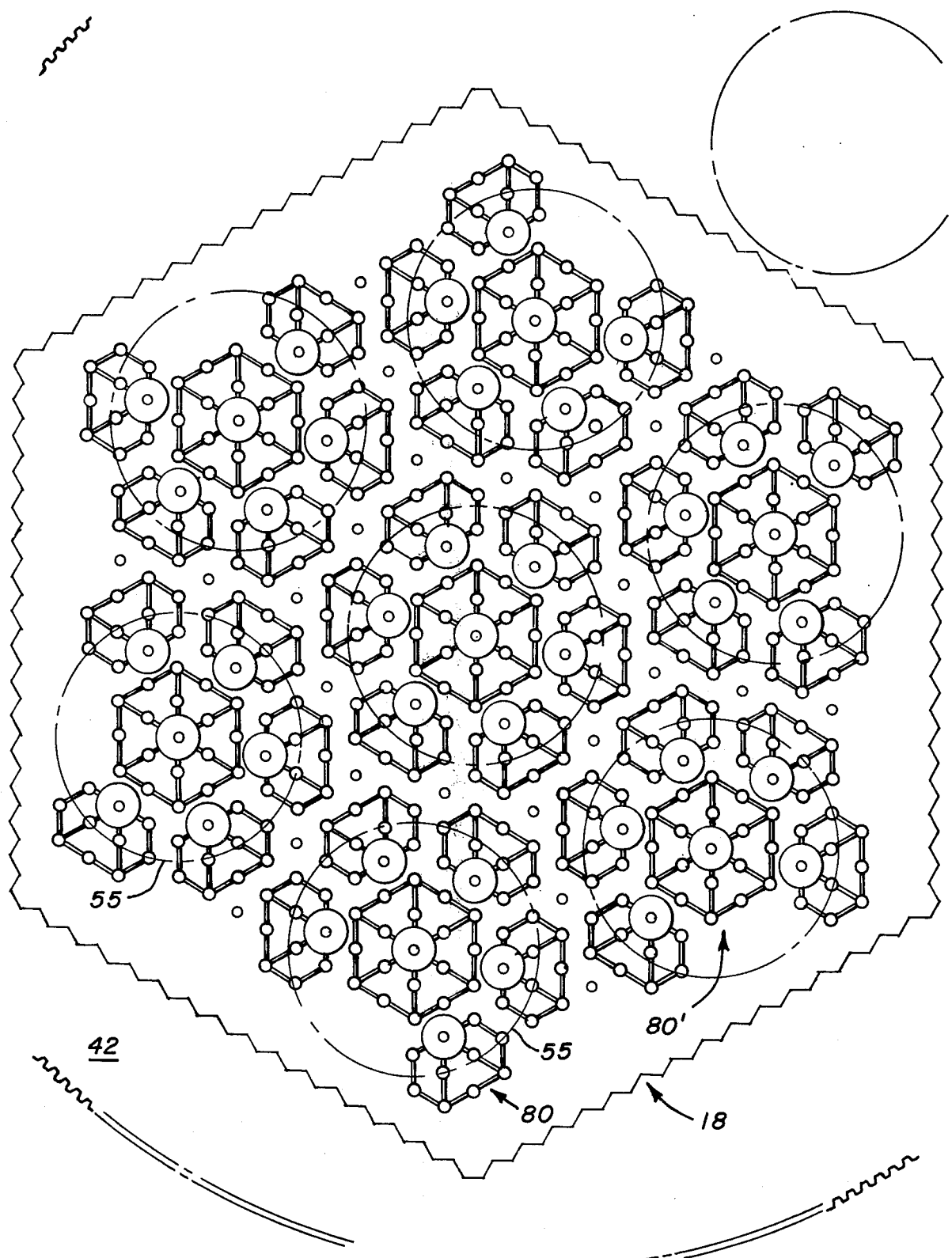
FIG. 18 is a plan view similar to that depicted in FIG. 4 but showing an alternative arrangement of the instrumentation plugs, only the outline of the nuclear core being depicted and the coextensive boundaries of the plugs being shown in dashed outline.

An alternative arrangement which will provide complete servicing of all assemblies forming the active core is disclosed in FIG. 18. In this arrangement an eccentric large plug 42 is shown having a concentric array of small plugs 55. As can be seen from this figure, 7 plugs provide the requisite core servicing capability and are arranged concentrically with respect to the core; the reactor vessel head, however, is positioned eccentrically with respect to the core. In this arrangement the entire active core is provided with servicing elements and some other reflector and shielding assemblies also have instrumentation. While such an arrangement does provide for a better instrumentation coverage and thus servicing of the nuclear core, it is not preferred due to the increased cost in providing an eccentric reactor vessel head which will result in a larger vessel head and reactor vessel.

Figure 16:
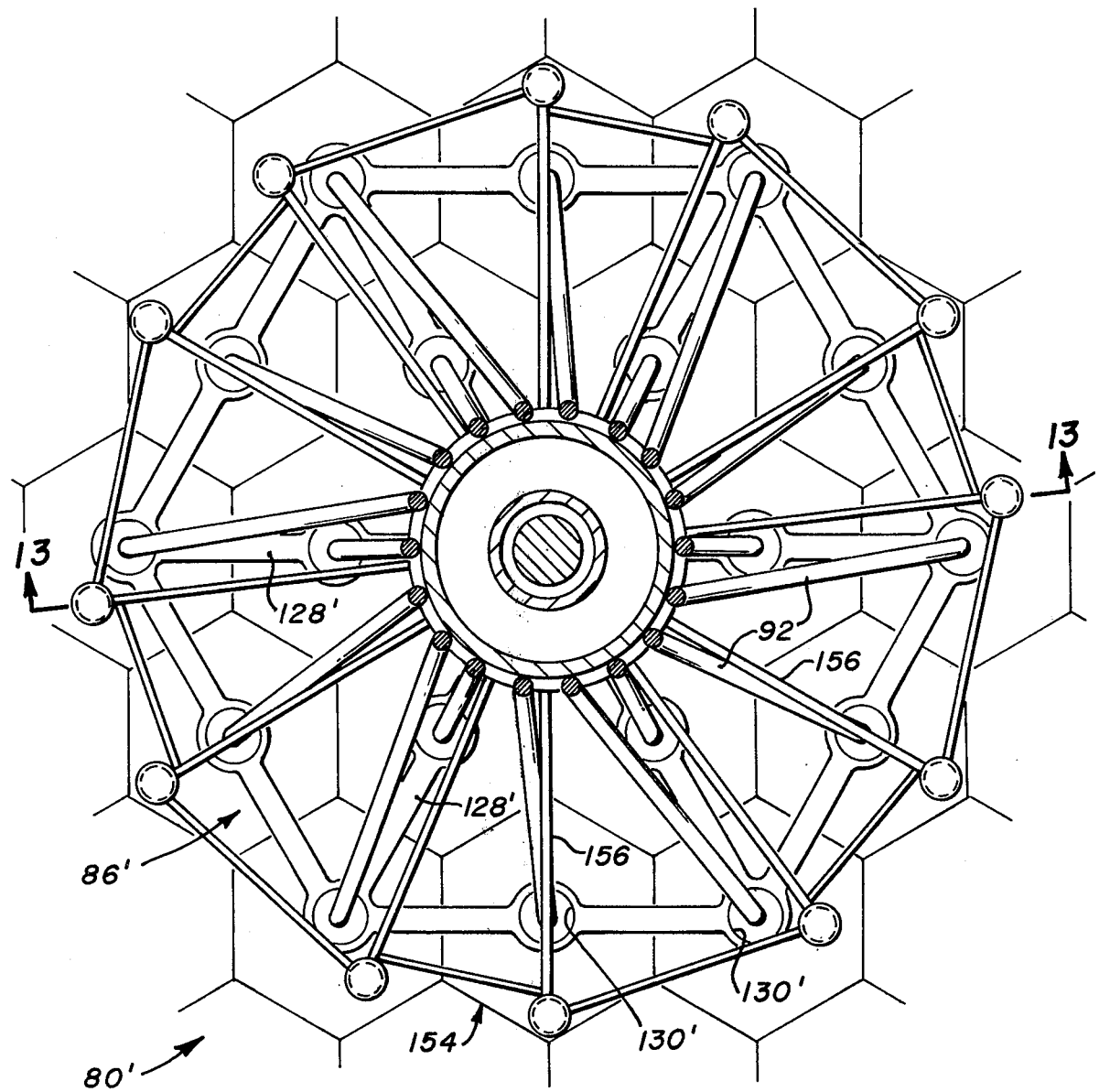
FIG. 16 is a further enlarged cross-sectional view of the lower end of the central instrument tree assembly taken along line 16—16 of FIG. 13.

In order to minimize and reduce the possibility of flow induced vibrations being set up in the guide tubes 78, 78' which support the instrument trees, a locking arrangement is employed to pin the 7 guide tubes in each plug together in a rigid structure. As best seen in FIGS. 6 and 7 and 16, the locking mechanism comprises a spider 154 which is welded to the central instrument tree guide tube 78' some distance above the lower end thereof. This spider arrangement is supplied with 12 spokes 156 which extend laterally outward therefrom and which are each furnished with an alignment pin 158 which extends downwardly at the extremity of the spokes. Appropriate collars 160 are fixed to each of the guide tubes 78 of the peripheral assemblies at an elevation above the lower end thereof. These collars 160 have mating holes or sockets 162 vertically arranged and oriented generally on the diametrically opposite side of the guide tube from the instrumentation probes 88 and support arms 86. The alignment pins 158 on the spider spokes 156 are adapted to engage and fit into the sockets 162 on the collars of the peripheral assemblies when the central assembly instrument tree is lowered into place in the core. Such an arrangement of locking insures that the peripheral assemblies 80 will be in correct alignment with respect to each other and with respect to the core assemblies and elements.

Figure 8:
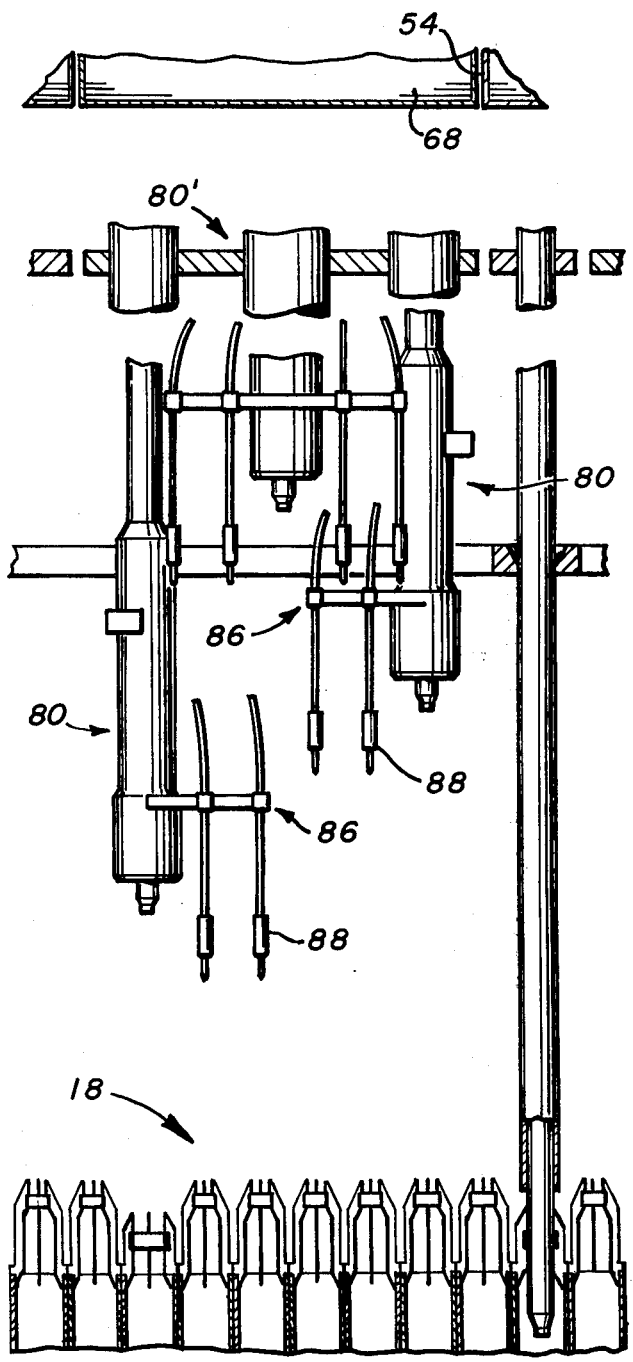
FIG. 8 is a sectional elevation similar to that as shown in FIG. 7 but with the instrumentation for the core in a condensed and stacked position.
Figure 10:
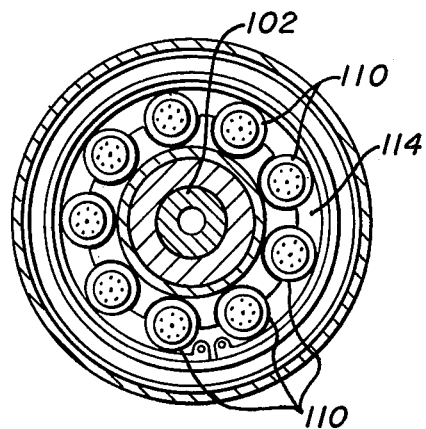
FIG. 10 is a cross-sectional view of the peripheral instrument tree assembly taken along ling 10—10 of FIG. 9.

The installation procedure for the plug mounted core instrumentation or servicing will now be described. Initially, 7 instrument tree assemblies 80, 80' mounted on each of the plugs 55 are maintained in a raised and compacted state and the plug 55 is lowered into position to rest on the appropriate flanges 70 within the opening 54 in the large rotatable cover 42. The arrangement and location of the instrument trees with the control rod drive extension 102 and instrument probes 88 is as shown in FIG. 8. The mechanism for maintaining the instrument trees in the raised position will be described hereafter. As can be seen from FIG. 8, the central instrument tree 80' is positioned the greatest distance above the nuclear core 18 and in the preferred embodiment this corresponds to a distance of approximately 53 inches. Directly beneath the central instrument tree 80' there are located a first set of three of the peripheral trees 80 in which the laterally extending support structure 86 and instrument probes have been rotated inwardly to lie completely beneath the plug and within the coextensive boundaries thereof as is evident upon viewing the lower end 68 of the plug in this figure. These three peripheral trees correspond to 3 alternately spaced trees and are located approximately 38 inches above the nuclear core. The lowermost set of instrument trees 80 correspond to the remaining three trees and are located approximately 25 inches above the nuclear core and are also in a compacted condensed state in which the lateral support structure 86 and probes are located totally within the coextensive boundaries of the plug. It is necessary to maintain these three elevations of instrument trees in order to fit all of the probes and support arms within the coextensive boundaries of the plug so as to permit insertion of the plugs through the penetration opening 54 in the reactor vessel head 14. Next the lowermost set of alternately spaced instrument trees are lowered with respect to the vessel head by appropriate means and, as this occurs, the guide pins 138 located within the nozzles 74 and engaging the camming slots 140 in the guide tubes 78 serve to rotate the laterally extending support structure 86 and instrument probes 88 approximately 180° as the GTIT moves downward into the nuclear core wherein the instrument probes 88 are positioned within the guide rings 132 joining the upwardly extending fins 134 of several of the fuel assemblies forming the nuclear core. If these peripheral trees comprise control assemblies the control rod drive extension 102 is lowered within the control assembly is alignment with the center guide tube of the peripheral tree and engages a control rod such as shown in FIG. 7. The complete rotation of 180° of course is achieved while the GTIT is totally above the nuclear core so as to prevent any interference between the instrument probes and the upper ends of the fuel assemblies. Next, the remaining three alternately spaced peripheral trees 80 are lowered, the guide pins, again, working in the cam slots to rotate the support structure 180° to bring the probes 88 into alignment so that they may be lowered into engagement with the nuclear core. Finally, the central instrument tree 80' is lowered and the alignment pins 158 on the locking spider 154 slide into engagement with the appropriate holes 162 on the collars 160 of the peripheral trees 80 to lock the seven guide tubes together in a rigid structure. This is the position shown in FIG. 7.

For refueling purposes, as will be described hereinbelow, it is necessary to completely remove the plug mounted instrumentation and core servicing assemblies from the reactor vessel head. In order to accomplish this removal, without interference, the trees must be stacked at three different levels such as shown in FIG. 8, this being the same arrangement shown for insertion of the plugs. Initially, the central tree 80' is raised approximately 53 inches to provide room underneath the plug for the peripheral trees 80, then three alternately spaced peripheral trees are raised approximately 38 inches and rotated inwardly by means of the pins engaging the camming slots and finally the three remaining peripheral trees are raised approximately 25 inches and also rotated inwardly to a compact state. Upon completion of these steps, all six of the peripheral instrument trees are within the coextensive plug boundaries and the plug may be removed from the reactor vessel head through the plug opening 54.

Figure 21B:
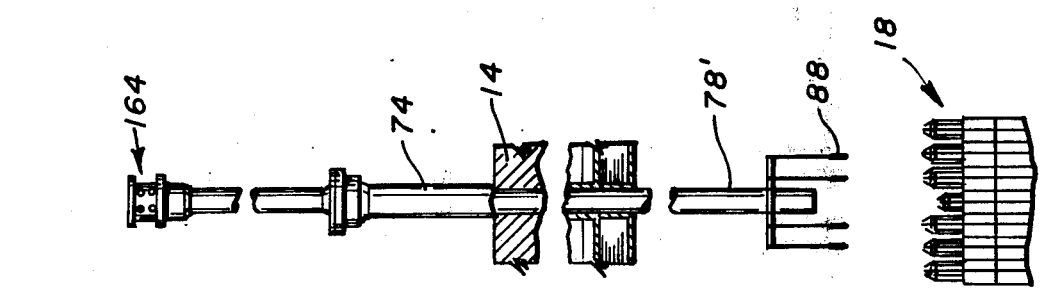
FIGS. 21a and 21b depict schematic representations of a central instrument tree assembly prior to disengagement from the nuclear core and following disengagement from the core, respectively.
Figure 21A:
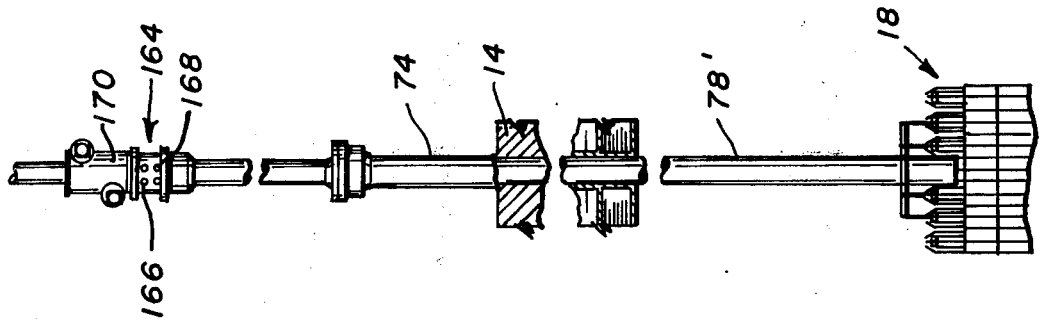

Accomplishment of the raising and lowering of the instrument trees to permit insertion and removal of the plugs is accomplished in a manner similar to that described for the control rod and instrument tree assemblies of copending application Ser. No. 537,283. With the control rod drive mechanism 28 and electrical connector assemblies 94 removed from the nozzles 74, 74', 142 on the reactor vessel head 14, and on the plugs 55, an instrument tree drive extension lock 164 is mounted to the nozzle 74. As seen in schematic FIGS. 21a and 21b, the instrument tree drive extension lock 164 includes an extension at its lower end and the lock assembly at its upper end. An instrument tree drive extension lock is needed for each of the instrument tree assemblies and accordingly for each plug nozzle. Two lock assemblies 166, 168 are associated with each of the drive extension locks. One lock 166 is adapted to be moved into locking engagement with a lock seat 169 on the guide tube end cap when the guide tube end cap, which holds the instrument pull tubes 104 and maintains them in their lowered position, and accordingly the guide tube and instrument tree, have been lifted vertically a sufficient distance for the lower end of the guide tube instrument tube to clear the core and be maintained at its appropriate elevation. The other lock 168 is positioned for locking engagment with another lock seat (not shown) in the control rod drive extension when the guide tube and instrument tree tube is raised as noted hereinabove and the drive rod extension is withdrawn upwardly to its fullest extend within the guide tube. This final configuration is depicted schematically in FIG. 21b. In order to raise the guide tube instrument tree to any control rod drive extension, an auxiliary instrument tree drive unit 170 is removably secured, such as by bolting, to the upper end of the drive extension rod. The auxiliary drive unit 170 contains one drive which substitutes for the conventional drive means to operate the drive rod extension and a second drive which vertically moves the guide tube and instrument tree tube. Because the auxiliary drive unit 170 is installed following a scram or a shutdown of the reactor and the drive rod extension is in its fully inserted position the drive for the rod extension must run down the fullest extent for engagement with the upper end of the rod extension and the connection is made by rotating the axis through an angle sufficient to couple the drive means with a breech block lock on the drive extension. The second drive of the auxiliary drive unit 170 is run down and rotated into engagement with the seat and the guide tube end lock cap and, upon actuation of the drive, serves to raise the guide tube instrument tree tube. The extension portion of the CDEL is necessary in order to raise the guide tube and instrument tree assembly the requisite distance in order to provide space beneath the plug for stacking of all the instrument trees. As the upwardly extending nozzles on the reactor vessel head are approximately 28 inches in height, different length drive extensions are provided, the length depending upon the desired final height of the guide tube and instrument tree assemblies to be raised. With the instrument tree assemblies maintained in their upper position by means of the drive extension locks, the auxiliary drives may be removed and the plug removed from the penetration in the reactor vessel head in a manner described hereinbelow in discussing the refueling scheme. It should be apparent there are other types of drive means and locking means which may be employed in order to raise and maintain the instrument trees in their raised and condensed position.

REFUELING PLUG SYSTEM

Rotating plug systems for providing core access in liquid metal cooled fast breeder reactors provide a convenient arrangement for exposing only a small area of the core at one time and for permitting line of sight through the head refueling, as is well known in the art. When nozzles are provided on the reactor vessel head for guiding and directing control elements and instrumentation probes into the nuclear core, penetrations for the rotating plug system are generally required to be located between the upwardly extending nozzles and between the penetrations through the head for such core servicing apparatus. When the nozzles for the core servicing apparatus on the reactor vessel head are arranged in a regular pattern, such as disclosed hereinabove with reference to the instrumentation system, a problem is created in having sufficient distance between adjacent nozzles within and without the rotating plugs for placement of rotational supporting bearings therebetween for supporting the rotating plugs for rotational movement in the penetrations in the reactor vessel head. This problem is further compounded where smaller assemblies make up the nuclear core since such smaller assemblies necessitate the nozzles being located closer together for a given pattern of control and instrumentation. Unless nozzle size can be made very small, it is not possible, or it is extremely difficult to place rotational supporting bearings between adjacent nozzles to provide the rotational support for the rotating plugs.

The present invention overcomes such problems by providing a skirt extension 172 and a refueling plug 174 which are substituted for instrumentation supporting plugs in the reactor vessel head. The skirt extension and refueling plug are interchanged with the instrumentation and control supporting plugs in the reactor vessel head. The skirt extension and refueling plug are interchanged with the instrumentation and control supporting plugs when core access is desired such as when the reactor is shut down for refueling. The refueling plug 174 is provided with an opening 176 therethrough which is sized to permit passage of fuel assemblies therethrough or for any other purposes in which core access is necessary. To prevent the escape of fission gases and contaminated cover gas from the reactor and to prevent the ingress of air into the reactor, sealing means are provided as well as removable closure means for sealing the penetration openings and other leakage paths which may exist by virtue of the substitution of refueling plugs for instrumentation and core servicing plugs.

Figure 19:
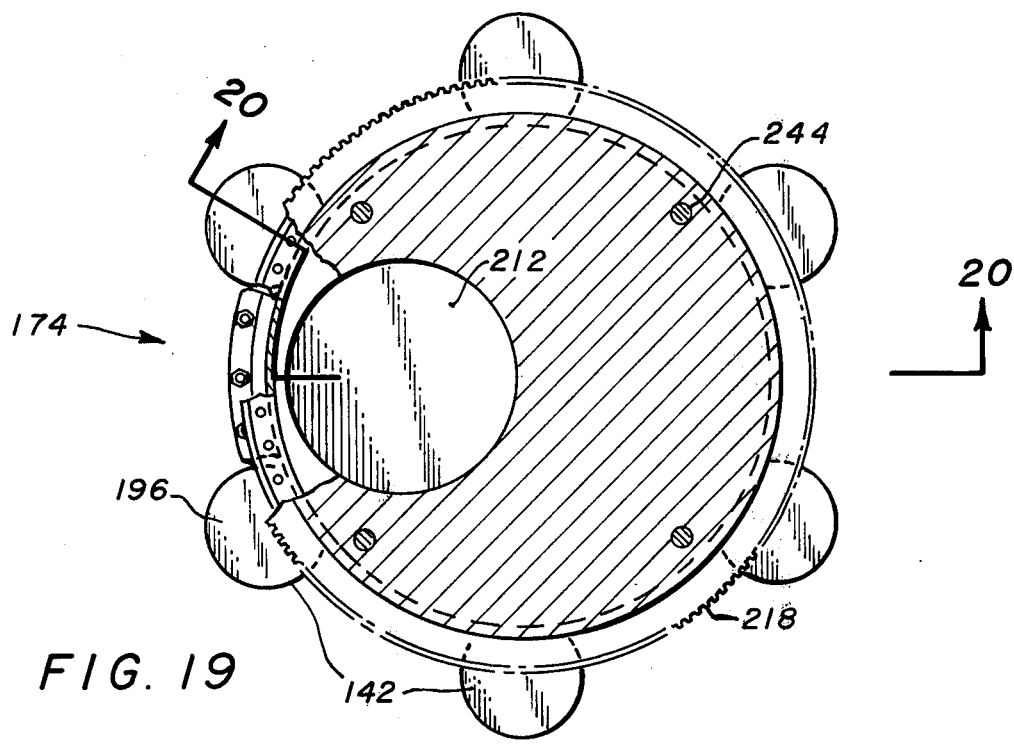
FIG. 19 is a section view of the refueling plug arrangement of the present invention, the refueling plug being rotatably supported within a circular opening of the vessel head.
Figure 20:
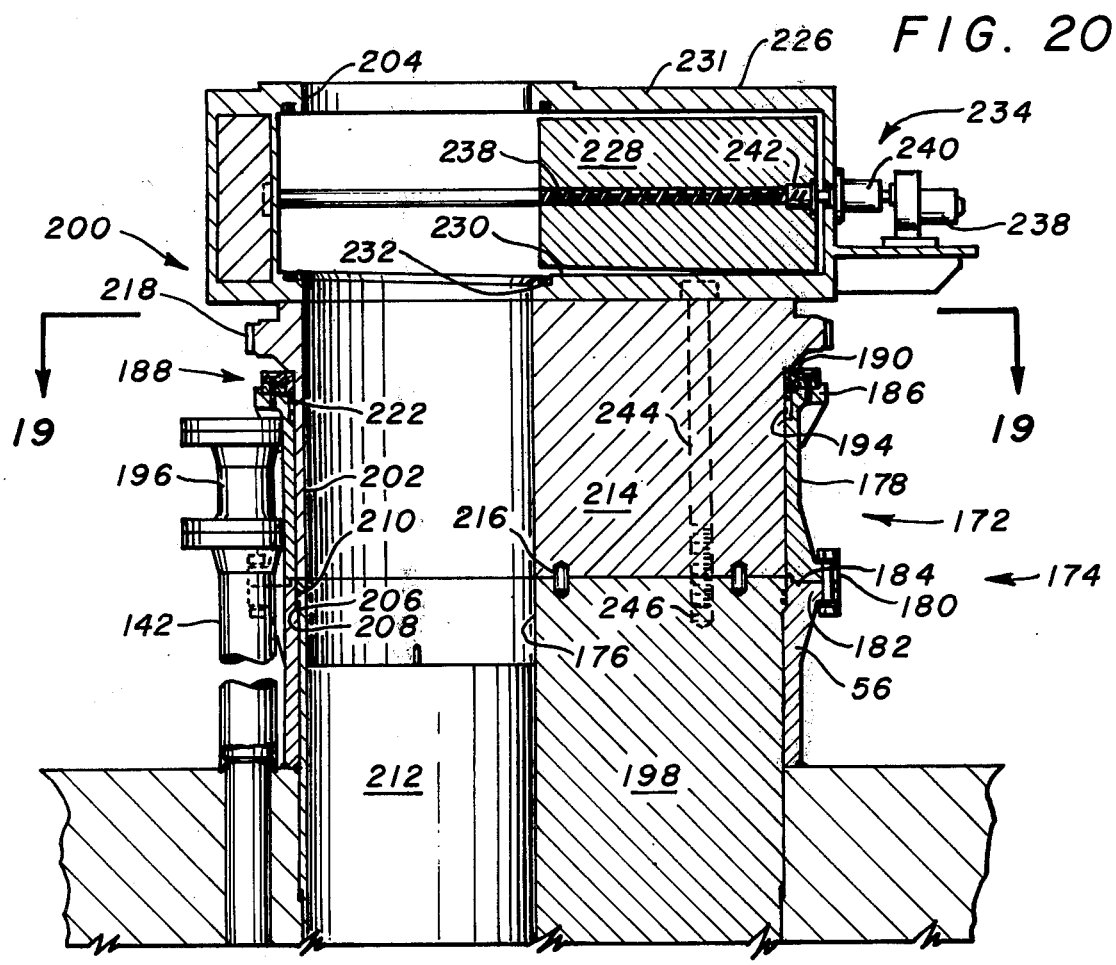
FIG. 20 is a sectional elevation of the refueling plug of FIG. 19 taken along line 20—20 of FIG. 19 and additionally showing the floor valve installed thereinabove.

Referring now specifically to FIGS. 19 and 20, the skirt extension or bearing support skirt 172 comprises a generally cylindrical member 178. The lower end of the bearing support skirt is provided with flanged portions 180 extending laterally outward therefrom which are adapted to mate with similar flange portions 182 on the upper end of the upwardly extending skirt 56 surrounding the penetration opening 54 in the reactor vessel head 14. The flange portions 180, 182 are arranged such that they interfit between adjacent upwardly extending individual nozzles 143 arranged about the periphery of the penetration opening as best seen in FIG. 19. Sealing means, such as a double O-ring type seal 184, are provided where the bearing supporting skirt 172 and the upwardly extending skirt 56 meet to provide a gas tight seal. The upper end of the bearing supporting skirt 172 is provided with an outwardly extending flange 186 about its circumference on which is supported the rotational bearings 188 of the refueling plug 174. The bearings are of the crossed-roller type in which the axis of rotation of the rollers 190 alternates about the circumference of the bearing 188. These rollers are captured between inner and outer races and this arrangement is in turn supported in position on the flange 186 of the upper end of the bearing supporting skirt 178 by means such as bolts 192 spaced about the circumference of the annular bearing and flange. Appropriate O-ring type seals 194 are provided along the interior surface of the bearing supporting skirt near its upper end for sealing the leakage path between the skirt 178 and the refueling plug 174. As can be seen from FIG. 20, the outwardly extending flange 186 at the upper end of the bearing supporting skirt 178 and thus the bearing 188 are positioned above the upper elevation of the upwardly extending individual nozzle 142 adjacent to the skirt 56 surrounding the penetration in the reactor vessel head. Also in the embodiment shown, this flange is above a control element drive extension box 196 mounted on the nozzle 142 which maintains the instrument or control rod drive extension in an elevated position to permit rotation of the large rotatable cover 42 without interference by the core servicing elements therein with the nuclear core.

In the preferred embodiment the refueling plug 174 is comprised of a handling plug 198 and a floor valve 200 each of which have axial penetrations or bores 202, 204 respectively therethrough sized to permit the insertion and removal of fuel assemblies and control assemblies therethrough. More particularly, these bores are sized to permit insertion of a fuel handling machine which is capable of extending down into the nuclear core and into which fuel assemblies will be raised and maintained in a bath of sodium or other liquid metal coolants as it is removed from the reactor vessel. Such a fuel handling machine is similar to that disclosed in copending application Ser. No. 430,292 entitled, "Nuclear Fuel Handling Apparatus." The handling plug 198 comprises a large substantially solid circular plug made of a suitable material, such as steel, which is inserted into the penetration opening provided in the large rotatable cover and which replaces the instrumentation servicing plug. The handling plug 198 is provided with a flanged surface 206 near its upper end which is sized to permit the lower end of the plug to be inserted in the opening defined by the skirt 56 and which engages a mating flanged surface 208 in the opening in the vessel head to limit the penetration of the plug into the opening. Appropriate sealing means such as O-ring type seals 210 are provided near the upper end to provide a gas tight seal. When first installed in the reactor, a shield plug 212 is inserted within the circular opening 202 in the handling plug 198. The shield plug 212 effectively seals the penetration to prevent leakage of gases into or out of the reactor vessel 12.

The floor valve 200 which comprises the other half of the refueling plug 174 includes a generally cylindrical lower portion 214 which is adapted to fit within the opening defined by bearing supporting skirt 56. Alignment pins 216 are provided on either the floor valve 200 or the handling plug 198 to ensure proper alignment of the two bores 202, 204 through the floor valve and the handling plug. A large ring gear 218 provided around the outer periphery of the floor valve 200 at about midelevation includes outwardly extending gear teeth adapted to be engaged by an appropriate drive mechanism for rotating the refueling plug 174 relative to the bearing supporting skirt 172. The drive mechanism, not shown, is similar to that described with reference to the small rotating plugs of U.S. application Ser. No. 537,284. Beneath the ring gear 218, there is provided along the outer surface of the floor valve an outwardly extending flange 220 which is adapted to engage and mate with the inner race of the bearing 188. In this way the floor valve 200 is supported on the bearing for rotational movement about its axis and about the axis of the penetration opening. Sealing means such as O-ring type seals 222 provided along the inner surface of the skirt extension 172 provide a gas tight seal between the extention and the floor valve. The valve portion 224 of the floor valve is positioned above the bearings and ring gear in the upper portion of the floor valve. During refueling, the upper surface 226 of the floor valve 200 interfaces with the refueling machine to form a hermetically sealed passage to transfer fuel assemblies from the reactor vessel. When the valve 224 is closed it provides a barrier of lead shielding for personnel protection. Basically, the floor valve is a heavily shielded gate valve. The valve disc 228 is tapered on its lower face to mate with a similarly tapered valve seat 230 provided in the body 231 of the upper portion of the floor valve. This configuration protects the O-ring lower sealing element 232 from damage when the disc is moved to close or open the passage. The valve body 231 is otherwise a hermetically sealed unit with connections provided for purging the body of the valve with clean argon or other similar gas. Movement of the valve disc 228 is achieved by a ball screw drive arrangement 234 mounted to the side of the floor valve and above the ring gear 218. The disc 228 is mounted on rails and rides on a series of ball bushings 236 and the ball screw drive arrangement 234 provides a motive force. The drive motor 238 is mounted outside of the valve body 231 and drives the ball screw shaft through a coupling 240. The shaft and motor are axially stationary and engage a ball nut 242 attached to the valve disc 228. Upon actuation of the motor the disc is caused to be inserted or retracted with the ball screw shaft 238 extending through a longitudinal cavity within the disc 228 when the valve is fully open. This arrangement is similar to that disclosed for the floor valve of co-pending application Ser. No. 430,292 with the exception that the penetration opening 204 in the floor valve is circular whereas in the co-pending application it was oval or obround.

In order to provide the requisite refueling coverage (to be described in more detail hereinbelow) it is necessary that the floor valve 200 which is rotatably supported on the bearings 188, be attached to the handling plug 198 so that the two may rotate together. This is accomplished by a series of screw jacks 244 provided in the upper surface of the floor valve which extend downward therethrough and into appropriate sockets 246 in the handling plugs. Upon actuation or tightening of the screw jacks, the handling plug is raised off the flanged surface 182 provided on the upwardly extending skirt so as to be coupled and mate with the floor valve. In this way the two components of the refueling plug rotate as a unit.

As can be appreciated, the bearing supporting skirt extension 172 is necessary with the core arrangement and nozzle arrangement on the reactor vessel head in order to place the bearings 188 in a location to permit rotation of the refueling plugs or whatever plug is provided inside of the skirt. In prior arrangements, enough space was available between adjacent nozzles on the rotating plug and on the reactor vessel head, however, with the extremely small fuel assemblies in the present configuration, this is not possible.

Instead it is necessary to remove the drive mechanism and electrical connectors from the upwardly extending nozzles and to utilize the skirt extension so that the bearings will be supported above the nozzles. As can be seen from the drawings, the laterally extending lip 186 which supports the bearings 188 on the skirt extension 172 overlie at least a portion of some of the nozzles 142 which are adjacent to the upwardly extending skirt 56 surrounding the boundary of the penetration.

In order to interchange the refueling plug and the plug mounted instrumentation assembly it is necessary to provide a special two-position handling cask 248 similar to that design employed to replace the instrument tree plug and the handling plug of co-pending application Ser. No. 537,283. This is schematically shown in FIGS. 22a through 22c. Initially, the core servicing means 88 are raised out of engagement with the core 18 so as to be free from the core in a manner as described hereinabove; i.e., the plug mounted core servicing apparatus are displaced from their expanded and lowered positions to their condensed and raised positions in which the instrumentation or other servicing means of the various trees are maintained in a stacked relationship completely within and beneath the plug boundaries. For the single core servicing means the control rod drive extension or instrumentation lead is raised a short distance out of engagement with the core and maintained in this raised position through use of appropriate drive extension locks. The auxiliary drives are then removed and the servicing means of both single and plug mounted instrumentation nozzles are maintained in a raised position by means of appropriate drive extensions. Next the two-position cask 248 is used to maintain the reactor cover gas and prevent release of fission products and secondly to shield the contaminated plugs. The handling cask 248 is mounted on the upwardly extending skirt 56 and the lower portion 249 extends upwardly to a distance above the drive extension locks on adjacent nozzles where it then expands to a larger size which is necessary in order to provide two chambers which are large enough to hold the core servicing plug 55 and the handling plug 198. The cask includes a lifting means for liftingly engaging the core servicing plug 55 and for moving it vertically up into one of the chambers of the cask. After the cask is positioned in sealing relationship on the upwardly extending skirt 56 the core servicing plug 55 is lifted into one of the chambers of the cask leaving the penetration 54 in the reactor vessel head 14 open. When the plug is entirely within the cask chamber it is moved laterally out of vertical alignment with the penetration opening and a second chamber of the cask moved into alignment therewith. This second chamber also includes an appropriate lifting and drive means which is engaged to the handling plug portion 198 of the refueling plug 174. The handling plug 198 is then lowered into the penetration opening 54 and allowed to rest on the inwardly protruding flange surfaces 206 of the upwardly extending skirt 56. When the handling plug is placed within the penetration opening, the shield plug 212 with appropriate seals is in place in the access opening 176 or bore therethrough. The handling cask 248 is then removed from the upwardly extending skirt 56; the bearing supporting skirt extension 172 is positioned in place and the floor valve 200 lowered to rest upon the bearings 188. Next, the screw jacks 244 on the upper surface of the floor valve 200 are actuated to engage the handling plug and raise it into engagement with the floor valve 200. While this is being done, the valve disc 228 of the floor valve 200 may be in either the closed or open position since the shield plug 212 is in place in the handling plug. After the floor valve 200 is properly installed, the valve disc 228 is opened and a second handling cask 250 (see FIG. 22c) is placed over the valve opening 204 and actuated to remove the shield plug 212 from the handling plug 198. Following this step the floor valve 200 is closed and the handling cask 250 containing the shield plug 212 is removed to a remote location. The refueling plug system is then in condition for operation. Upon proper rotation of the refueling plugs 174 and the large rotatable cover 42, the access port in the floor valve and handling plug may be placed over any desired core location. The next step in the refueling operation is to position the fuel handling machine, not shown, above the reactor access port by an appropriate means. Once aligned the entire machine is then coupled to the floor valve 200 and the passage between the floor valve and the handling machine purged with argon and checked for leak tightness to ensure that no air is permitted to enter the reactor. Such operations are similar to those described with respect to the fuel handling machine described in co-pending application Ser. No. 430,292. For operation with the floor valve 200 and handling plug 198 having a circular access opening 202, 204, the fuel handling machine of co-pending application Ser. No. 430,292 will have to be modified for proper operation. Such modifications are within the purview of persons skilled in the art and familiar with the description of fuel handling machine of the co-pending application Ser. No. 430,292. Replacement and installation of fuel assemblies may then be accomplished.

Figure 23:
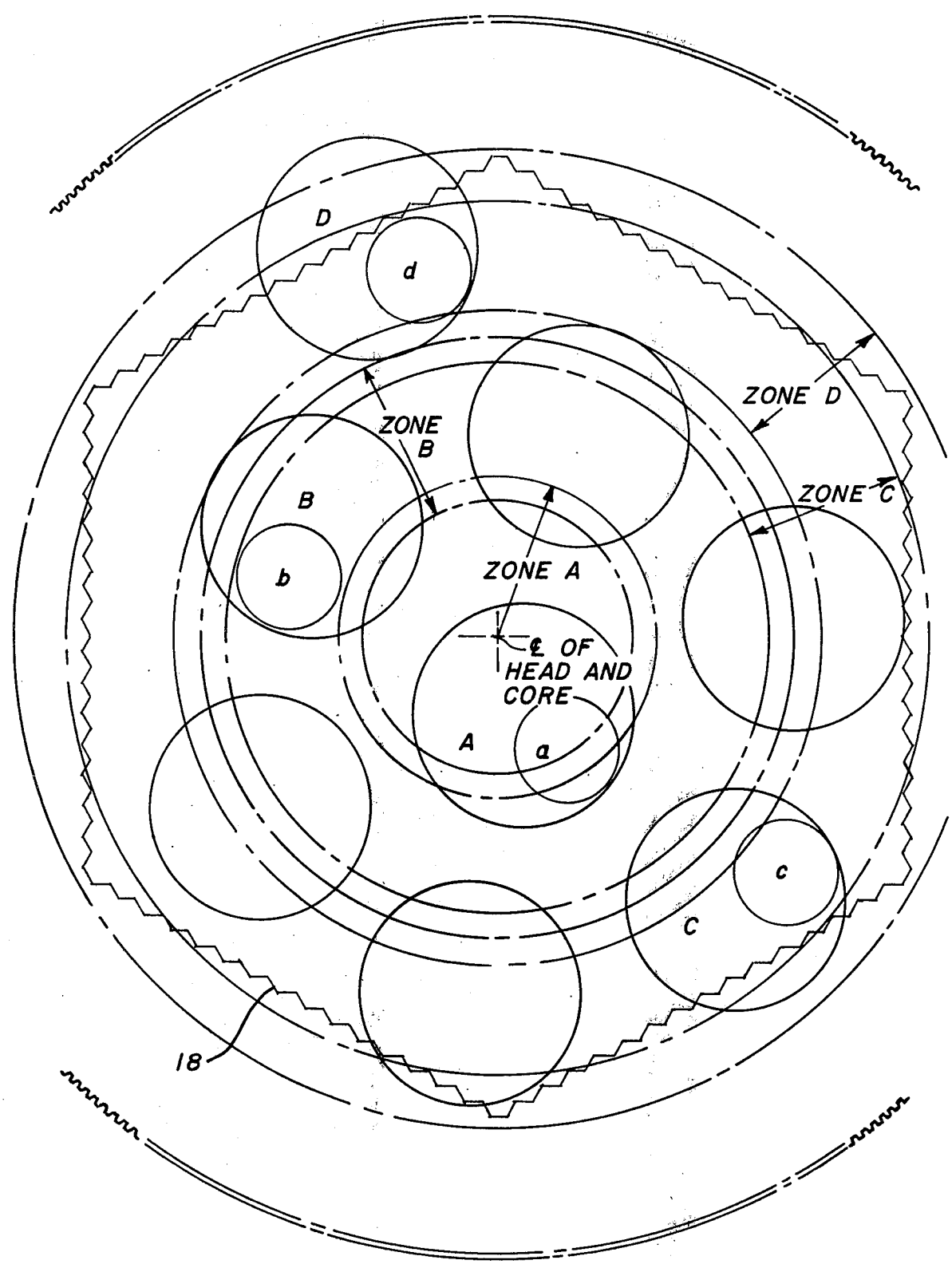
FIG. 23 is a schematic representation of the core refueling coverage utilizing the instrument tree plug arrangement of FIG. 4, the sweep of the refueling plugs being indicated.

With each of the plug mounted instrumentation schemes disclosed hereinabove with reference to the core servicing plugs 55 only four refueling plugs 174 are needed in order to adequately provide access directly over each assembly comprising the nuclear core. For the preferred plug mounted instrumentation scheme, shown in FIG. 4, in which the reactor vessel head 14 is concentrically positioned with respect to the nuclear core 18 and in which the array of instrumentation plugs 55 is eccentric with respect to the core in the reactor vessel head, the penetrations into which refueling plugs should be placed in order to provide access to the core over each assembly are depicted in FIG. 23 and are labled plugs A, B, C and D. FIG. 23 is a schematic representation of the reactor vessel head with the core 18 being shown in outline. The circles drawn about the center of the reactor vessel head represent the limit of reach of each of the refueling plugs A, B, C and D and accordingly depict the zones of the core which may be serviced by each of these plugs. That is, they depict the inner and outer boundaries of refueling coverage obtainable with each of the plugs A, B, C and D. As noted above, insertion and withdrawal of fuel assemblies is accomplished with the use of a fuel handling machine which enters through the access ports in the floor valve and the handling plugs to reach into the core and engage or release a fuel assembly. These access ports are indicated on the refueling plugs as circular portions *a, b, c, d* within the circles A, B, C, D respectively indicating the refueling plugs. The zones of the core served by each of the refueling plugs are indicated as circular or annular spaces and labled zone A, B, C or D respectively. As can be seen in FIG. 23, there is at least a small overlap of the core area which is served by each of the plugs.

Figure 24:
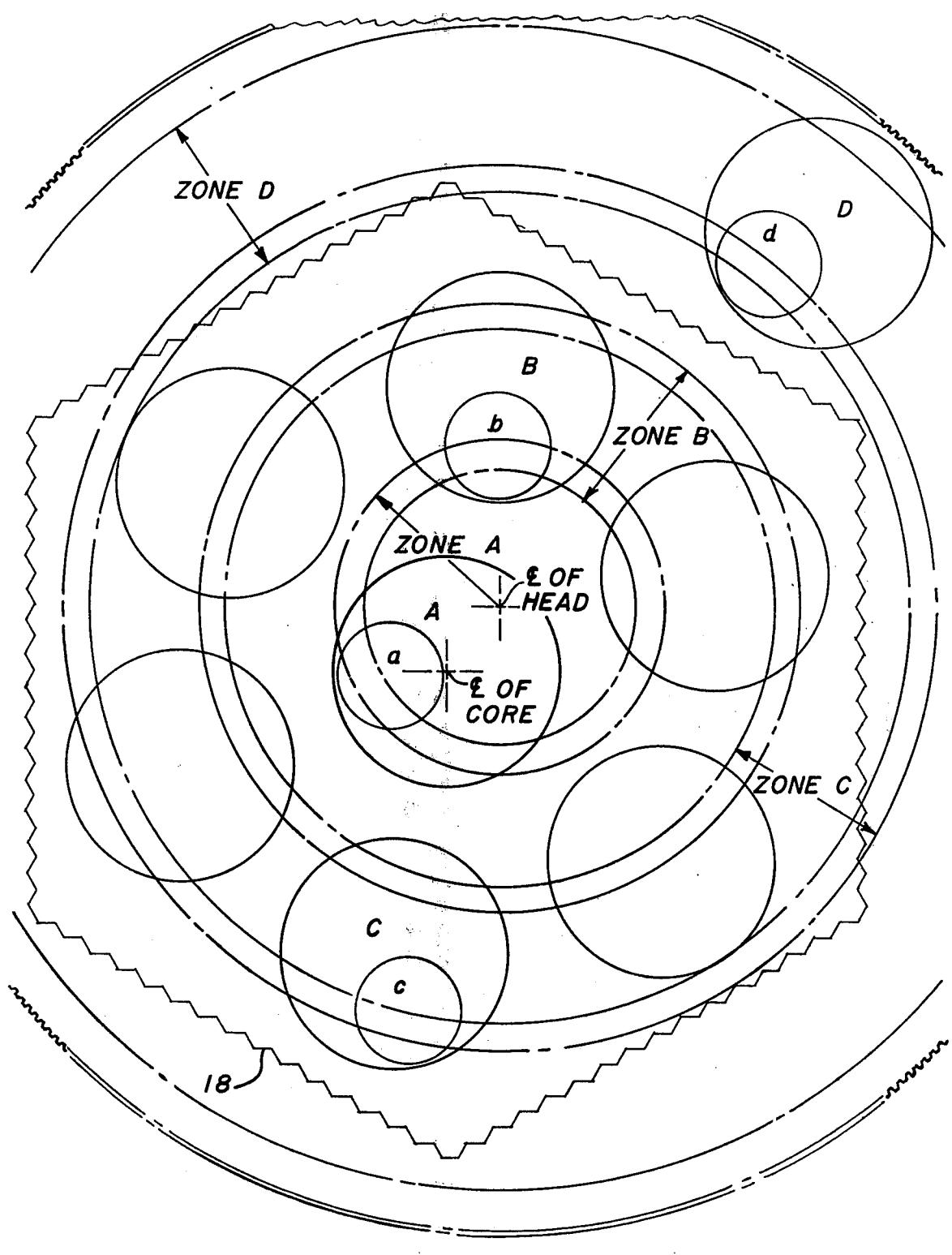
FIG. 24 is a schematic representation similar to that of FIG. 22 but showing the refueling coverage of the nuclear core for the instrument tree plug arrangement depicted in FIG. 18 and the sweep of the refueling plugs also being indicated.

A similar schematic representation based on the plug arrangement shown in FIG. 18 and again indicating the refueling plugs as A, B, C and D is shown in FIG. 24. As with FIG. 23, each of the zones served by each of the refueling plugs A, B, C and D are labled and indicated as annular or circular rings. This refueling coverage corresponds to an eccentric reactor vessel head and a concentric array of plugs.

With either of the refueling schemes depicted in FIGS. 23 and 24, the plug or plug penetrations not including refueling plugs may retain the core servicing plugs in place. The instrument trees attached and supported by these servicing plugs, of course, will necessarily have to be maintained in a raised and compacted position so as not to interfere with the core upon rotation of the large rotatable cover and the refueling plugs, and so as not to interfere with the fuel handling machine upon its insertion into the acccess port in the refueling plugs.

SUMMARY

Accordingly, there has been disclosed hereinabove a novel core servicing apparatus which is mounted to plugs which in turn are supported within penetrations of the reactor vessel head in order to provide servicing functions to the assemblies comprising the nuclear core of a liquid metal cooled fast breeder reactor. The core servicing apparatus includes a plurality of support columns suspended from a removable plug mounted in the reactor vessel head. Laterally extending rigid support arms are fixed to the support columns and a plurality of core servicing means are supported by and extend downwardly from the lateral support arms. Core servicing means are supported in a fixed array with respect to the support columns. Rotational motion means are provided for rotating and moving vertically the support columns to move the servicing means between condensed and expanded states. When in the condensed state, in the preferred embodiment, the servicing means of the plurality of support columns are maintained in stacked relationship in which the servicing means of one of the columns are supported vertically above and within the co-extensive boundaries of the plug above the servicing means of another of the support columns, the servicing means of all the support columns being maintained within the co-extensive boundaries of the plug. When in the expanded position, the servicing means of the support columns are maintained at the same vertical elevation.

Also disclosed herein is a refueling arrangement for a liquid metal cooled fast breeder reactor of a type having a reactor vessel head on which are mounted upwardly extending nozzles in which are supported core servicing apparatus of the nuclear core. Some of the nozzles are mounted on removable stationary plugs. The refueling arrangement comprises a bearing supporting extension skirt and a refueling plug. The extension skirt is mounted upon an upwardly extending skirt surrounding the boundary of the penetration in the reactor vessel head provided for the core servicing plug and serves to support rotational bearings above the elevation of adjacent nozzles on the reactor vessel head. The refueling plug is rotatably supported on the rotational bearings of the bearing support extension skirt and is provided with an access port therethrough for providing refueling access to the core of the nuclear reactor. In the preferred embodiment the refueling plug comprises a handling plug supported within the upwardly extending skirt on the reactor vessel head and a floor valve having its bore in line with the bore of the handling plug and being supported on the rotational supporting bearings. The floor valve is coupled to the handling plug so that the two rotate together and the floor valve is provided with a closure means for sealingly closing the access port therethrough.

The embodiments shown and described are merely illustrative of the present invention and changes may be made as well as modifications without departing from the scope of the present invention. What is thought to be protected here and is only that which is set forth in the appended claims.

What is claimed is:

1. An improved nuclear reactor arrangement of the type having a reactor vessel housing a nuclear core comprised of a plurality of elongated hexagonally shaped assemblies nested in a close fitting array, some of the said assemblies being fuel assemblies and others of said assemblies being control assemblies, said vessel having an opening in the top thereof; a reactor vessel head for said opening in the top of said vessel, said vessel head comprising a large rotatable cover having a lateral dimension at least as great as the lateral dimension of said core and having a plurality of circular openings through said cover positioned about the surface thereof; a plurality of small plugs for said openings in said large rotatable cover, said plugs effectively sealing off the interior of said vessel through said openings; a plurality of upwardly extending nozzles mounted on the upper surface of said large rotatable cover and said small plugs, some of said nozzles being in close proximity to the boundary of said openings in said large rotatable cover, the interior of each of said nozzles communicating with the interior of said reactor vessel through said vessel head for supporting and providing access through the head for servicing apparatus; upwardly extending skirts mounted on said large rotatable cover about the periphery of said circular openings therein, said upwardly extending skirts effectively passing between adjacent nozzles on said large rotatable cover and on said small plugs so as not to interfere with the penetrations therethrough, some of said nozzles on said large rotatable cover and said plugs being in close proximity to said skirts; drive mechanisms mounted on the top of some of said nozzles on said vessel head and having means associated therewith to be operatively connected to said core servicing apparatus within said nozzle for effectively controlling and operating said core servicing apparatus within said core, the elevation of said drive mechanisms mounted on some of said nozzles extending substantially above the elevation of said skirts about the boundary of said openings in said vessel head; the improvement comprising a skirt extension and a refueling plug for each of said openings in said rotatable cover for providing access to said core over each of said assemblies therein, said skirt extension being mountable in sealing relationship to said upwardly extending skirt when said nozzle supporting plug is removed from said opening in said large rotatable cover, said skirt extension extending upwardly above the upper elevation of said nozzles on said large rotatable cover from which said drive mechanisms have been removed, said skirt extension having a laterally extending lip extending laterally outward therefrom, a portion of which overlies and is above the said nozzles in close proximity to said upwardly extending skirt on said reactor vessel head, and said skirt extension including bearing means mounted on said lateral extending lip thereof for rotatably supporting said refueling plug in said opening in said large rotatable cover; and said refueling plug including an opening therethrough through which said assemblies may pass, said opening in said refueling plugs providing direct access in line over each of said assemblies of said core upon rotation of said refueling plug and said large rotatable cover.

2. The arrangement of claim 1 wherein there are a plurality of potential control clusters defined by pluralities of said hexagonally shaped assemblies in a portion of said core, each of said potential control clusters being defined by a regular pattern of seven assemblies in which one assembly is surrounded by an contiguous with the six other assemblies of said regular pattern, said plurality of potential control clusters being defined to provide an interfitting arrangement thereof so that every assembly in said portion of said core forms a part of one and only one potential control cluster; wherein each of said upwardly extending nozzles on said large rotatable cover and said small plug overlies and is in alignment with the central assembly of a potential control cluster of assemblies when said large rotatable cover is in a first position; and wherein said upwardly extending skirt about the boundary of said openings and said large rotatable cover is between said upwardly extending nozzles which are in alignment with and overlie adjacent interfitting potential control clusters.

3. The improved nuclear reactor arrangement of claim 2 wherein the lateral dimension of at least one of said small plugs is such as to include within its boundary said upwardly extending nozzles overlying and in alignment with a group of seven interfitting potential control clusters in which there is one central potential control cluster and six surrounding potential control clusters.

4. The improved nuclear reactor arrangement of claim 3 wherein said upwardly extending skirts have laterally extending portions extending radially outward from said opening, said laterally extending portions being circumferentially located between adjacent upwardly extending nozzles mounted on said large rotatable cover about the periphery of said opening therein; and wherein said extension skirt has complementary lateral extending portions below said lateral extending lip thereof; and wherein fastening means are provided for fastening together said lateral extending portions on said skirt and said extension skirt between adjacent upwardly extending nozzles about the periphery of said opening about the boundary of which said skirt is positioned.

5. The improved nuclear reactor arrangement of claim 4 wherein said refueling plug comprises two stacked plugs, one of said plugs being fully positionable within said opening below the upper elevation of said upwardly extending skirt and wherein said other plug is supported by said rotational bearings at the upper end of said skirt extension when supported in said opening in said rotatable cover, said second plug being attachable to said first plug to raise said first plug to permit rotation thereof.

6. A method for facilitating access to each of the assemblies of a nuclear reactor of the type having a reactor vessel housing a nuclear core comprised of a plurality of elongated hexagonally shaped assemblies some of which are fuel assemblies and some of which are control assemblies, said vessel having an opening in the top thereof; a reactor vessel head for said opening in the top of said vessel, said head comprising a large rotatable cover having a lateral dimension at least as great as the lateral dimension of said core, said large rotatable cover having a plurality of circular openings therethrough, and upwardly extending skirts about the boundary of said openings, and a plurality of small plugs for said openings mounted on said upwardly extending skirts, and said vessel head further having a plurality of upwardly extending nozzles mounted on said large rotatable cover and said small plugs in close proximity to, but free of interference with said skirts, the interior of said nozzles each communicating with the interior of said vessel through said vessel head; a plurality of devices mounted on some of said upwardly extending nozzles which extend down into and through said nozzles and said vessel head, said devices being removable from said nozzles and said devices extending above the elevation of said skirts above said vessel head; the method comprising: removing said devices from the top of said nozzles; removing said small plugs from said holes in said large rotatable cover; mounting an extension skirt on the top of each of said upwardly extending skirts, said extension skirt having a laterally extending lip portion extending laterally outward about the periphery of said opening in said rotatable cover, and having supporting bearings positioned on and supported by said laterally extending lip portion of said extension skirt, said laterally extending lip and said bearing supported thereon being located above the elevation of said nozzles with said devices removed therefrom and portions of said laterally extending lips overlying directly at least a portion of said upwardly extending nozzles in close proximity to said upwardly extending skirts; mounting a refueling plug on said bearings, said rotational supporting bearings supporting said refueling plugs for rotational movement relative to said extension skirt, said refueling plug having a closable access opening therethrough for providing access through each of said assemblies of said nuclear core upon rotation of said large rotatable cover and said refueling plugs.

7. The improved method of claim 6 in which said refueling plug is comprised of two stacked plugs, wherein the step of mounting said refueling plug on said rotational bearings supported on said laterally extending lip of said extension skirt comprises first placing one of said plugs into the opening in said large rotatable cover and allowing it to rest and be supported by said upwardly extending skirt, mounting said second plug in said opening above said first plug to be supported by said rotational support bearings, operatively coupling said second plug to said first plug and raising said first plug off said support by said upwardly extending skirt, whereby said two stacked plugs may rotate relative to said extension skirt and said upwardly extending skirt within said opening provided in said large rotatable cover.

* * * * *